(12) United States Patent
Kodama

(10) Patent No.: US 11,501,635 B2
(45) Date of Patent: Nov. 15, 2022

(54) VEHICLE-TO-VEHICLE COMMUNICATION SYSTEM, ROADSIDE COMMUNICATION APPARATUS, IN-VEHICLE COMMUNICATION APPARATUS, AND VEHICLE-TO-VEHICLE COMMUNICATION METHOD

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Yuichi Kodama, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 569 days.

(21) Appl. No.: 16/470,579

(22) PCT Filed: Dec. 6, 2017

(86) PCT No.: PCT/JP2017/043770
§ 371 (c)(1),
(2) Date: Jun. 18, 2019

(87) PCT Pub. No.: WO2018/116827
PCT Pub. Date: Jun. 28, 2018

(65) Prior Publication Data
US 2020/0111346 A1    Apr. 9, 2020

(30) Foreign Application Priority Data

Dec. 20, 2016  (JP) .............................. JP2016-247163
Mar. 24, 2017  (JP) .............................. JP2017-059683

(51) Int. Cl.
*G08G 1/01*    (2006.01)
*H04W 4/46*    (2018.01)
(Continued)

(52) U.S. Cl.
CPC .......... *G08G 1/0116* (2013.01); *G07C 5/008* (2013.01); *G08G 1/0112* (2013.01); *H04B 7/026* (2013.01);
(Continued)

(58) Field of Classification Search
CPC .... G08G 1/0116; G08G 1/0112; G08G 1/096; G08G 1/096791; G08G 1/096783;
(Continued)

(56) References Cited

U.S. PATENT DOCUMENTS 10,327,223 B2 * 6/2019 Lee ....................... H04W 4/021
2016/0169688 A1 * 6/2016 Kweon .................. G08G 1/162
701/522

(Continued)

FOREIGN PATENT DOCUMENTS

JP    2001-202599 A    7/2001
JP    2007-079804 A    3/2007
(Continued)

OTHER PUBLICATIONS

International Search Report, Application No. PCT/JP2017/043770, dated Mar. 13, 2018. ISA/Japan Patent Office.

*Primary Examiner* — Hirdepal Singh
(74) *Attorney, Agent, or Firm* — Honigman LLP

(57) ABSTRACT

A vehicle-vehicle communication system performs wireless communication between multiple vehicles each having an in-vehicle communication apparatus that transmits and receives information using a wireless signal. The vehicle-vehicle communication system includes a roadside communication apparatus including a roadside reception unit (Continued)

receiving information transmitted by the in-vehicle communication apparatus using a wireless signal and a roadside transmission unit transmitting the information received by the roadside reception unit using a wireless signal, and relays communication between multiple vehicles. The in-vehicle communication apparatus includes a vehicle-side reception unit that receives information wirelessly transmitted by an in-vehicle communication apparatus mounted in another vehicle and information wirelessly transmitted by a roadside communication apparatus; a determination unit determines whether or not the information received by the vehicle-side reception unit is needed; and an information processing unit performs information processing based on information determined by the determination unit as being needed.

12 Claims, 22 Drawing Sheets

(51) Int. Cl.
*H04B 7/155* (2006.01)
*G07C 5/00* (2006.01)
*H04B 7/026* (2017.01)
*H04W 4/48* (2018.01)

(52) U.S. Cl.
CPC ............. *H04B 7/155* (2013.01); *H04W 4/46* (2018.02); *H04W 4/48* (2018.02)

(58) Field of Classification Search
CPC .......... G08G 1/161; H04W 4/46; H04W 4/48; H04W 4/023; H04B 7/155; H04B 7/026; G07C 5/008
USPC ......................................................... 701/117
See application file for complete search history.

(56) References Cited

U.S. PATENT DOCUMENTS

| | | |
|---|---|---|
| 2017/0345297 A1 | 11/2017 | Umehara et al. |
| 2018/0184353 A1* | 6/2018 | Kumabe ................ H04W 40/12 |
| 2018/0234163 A1* | 8/2018 | Yasukawa .......... H04B 7/15542 |
| 2019/0263336 A1* | 8/2019 | Haga ..................... B60R 16/023 |

FOREIGN PATENT DOCUMENTS

| | | |
|---|---|---|
| JP | 2008-294646 A | 12/2008 |
| JP | 2009-217593 A | 9/2009 |
| JP | 2009-252214 A | 10/2009 |
| JP | 2015-106294 A | 6/2015 |
| JP | 2016-024591 A | 2/2016 |

* cited by examiner

Legend
A= Vehicle

Legend
A= Vehicle

Legend
A= Vehicle

Legend
A= Vehicle

Legend
A= Vehicle

VEHICLE-TO-VEHICLE COMMUNICATION SYSTEM, ROADSIDE COMMUNICATION APPARATUS, IN-VEHICLE COMMUNICATION APPARATUS, AND VEHICLE-TO-VEHICLE COMMUNICATION METHOD

CROSS-REFERENCE TO RELATED APPLICATIONS

This application is the U.S. national stage of PCT/JP2017/043770 filed on Dec. 6, 2017, which claims priority of Japanese Patent Application No. JP 2016-247163 filed on Dec. 20, 2016 and Japanese Patent Application No. JP 2017-059683 filed on Mar. 24, 2017, the contents of which are incorporated herein.

TECHNICAL FIELD

The present disclosure relates to a vehicle-vehicle communication system and a vehicle-vehicle communication method for performing transmission and reception of information wirelessly between multiple vehicles, and a roadside communication apparatus and an in-vehicle communication apparatus that are included in the system.

BACKGROUND

In recent years, attention has been given to a vehicle-vehicle communication system that enables exchange of various types of information between vehicles due to an in-vehicle communication apparatus mounted in a vehicle performing transmission and reception of wireless signals with an in-vehicle communication apparatus mounted in another vehicle. For example, a system can be realized in which it is determined whether or not another vehicle is approaching by exchanging position information of the vehicle with multiple vehicles, and thus collision of the vehicles or the like is avoided. Also, heretofore, road-vehicle communication systems that provide various types of information using wireless signals from a roadside communication apparatus installed on a road to an in-vehicle communication apparatus mounted in a vehicle have been practically used. The information that is transmitted from the roadside communication apparatus to the in-vehicle communication apparatus can be information such as the lighting state of a traffic light or surrounding traffic information, for example, and a vehicle that has received such information can perform processing such as alerting the driver of the vehicle or driving assistance control of the vehicle, for example.

JP 2016-24591A proposes a communication system for realizing vehicle-vehicle communication using an in-vehicle apparatus that performs obstacle detection or the like by transmitting an electromagnetic wave to the outside of the vehicle, receiving the reflected wave of the transmitted electromagnetic wave, and acquiring information on an object that is present on the outside based on the received wave. In this communication system, the in-vehicle apparatus acquires information on the vehicle, transmits an electromagnetic wave including the information, receives an electromagnetic wave from the outside, extracts information included in the received electromagnetic wave, and stores the information in the storage unit. When the information on the other vehicle is stored in the storage unit, the in-vehicle apparatus transmits an electromagnetic wave including the information on the other vehicle and the information on the vehicle.

In the vehicle-vehicle communication system, the in-vehicle communication apparatus mounted in the vehicle transmits a wireless signal with a predetermined frequency, and the wireless signal is received by the other vehicle, which is within the coverage of the wireless signals. However, for example, if a large building is near an intersection and the building is interposed between the two vehicles, or the like, there is a possibility that a wireless signal transmitted from one vehicle will be blocked by the building and will not be able to reach the other vehicle. In particular, in a vehicle-vehicle communication system in which 5.9 GHz is used as the frequency of the wireless signals, there is a high likelihood that the arrival of the wireless signals will be hindered by an obstruction.

The present disclosure has been made in view of the foregoing circumstance, and aims to provide a vehicle-vehicle communication system, a roadside communication apparatus, an in-vehicle communication apparatus, and a vehicle-vehicle communication method, according to which it is possible to transfer information between vehicles, even if the arrival of the wireless signals is hindered by an obstruction between the vehicles.

SUMMARY

A vehicle-vehicle communication system according to the present disclosure is a vehicle-vehicle communication system for performing wireless communication between a plurality of vehicles each having an in-vehicle communication apparatus for transmitting and receiving information by wireless signals, the vehicle-vehicle communication system including a roadside communication apparatus that is installed on a road, includes a roadside reception unit configured to receive information transmitted by the in-vehicle communication apparatus using a wireless signal and a roadside transmission unit configured to transmit information to the in-vehicle communication apparatus using a wireless signal, and is configured to relay communication between vehicles by transmitting the information received by the roadside reception unit using the roadside transmission unit.

Also, in the vehicle-vehicle communication system according to the present disclosure, the in-vehicle communication apparatus includes: a vehicle-side reception unit configured to receive information wirelessly transmitted by an in-vehicle communication apparatus mounted in another vehicle and information wirelessly transmitted by the roadside transmission unit of the roadside communication apparatus; a determination unit configured to determine whether or not the information received by the vehicle-side reception unit is needed; and an information processing unit configured to perform information processing based on information determined by the determination unit as being needed.

Also, in the vehicle-vehicle communication system according to the present disclosure, the determination unit determines that the information received by the vehicle-side reception unit is not needed if the information is information that is the same as information that was received previously.

Also, in the vehicle-vehicle communication system according to the present disclosure, the in-vehicle communication apparatus includes: an acquisition unit configured to acquire information relating to the vehicle; and a vehicle-side transmission unit configured to wirelessly transmit the information acquired by the acquisition unit, and the determination unit determines that the information received by the vehicle-side reception unit is not needed if the information is information that was transmitted by the vehicle-side transmission unit of the in-vehicle communication apparatus.

Also, in the vehicle-vehicle communication system according to the present disclosure, the information processing unit performs processing for transmitting information determined by the determination unit as being needed to another in-vehicle device mounted in the vehicle.

Also, in the vehicle-vehicle communication system according to the present disclosure, the in-vehicle communication apparatus includes: an acquisition unit configured to acquire information relating to the vehicle; and a vehicle-side transmission unit configured to wirelessly transmit the information acquired by the acquisition unit, and the roadside communication apparatus includes a relay determination unit configured to determine, based on the information received by the roadside reception unit, whether or not the information is to be relayed.

Also, in the vehicle-vehicle communication system according to the present disclosure, if a vehicle that is a transmission source of the information received by the roadside reception unit is in a stopped state, the relay determination unit determines that the information is not to be relayed, and if the vehicle that is the transmission source is not in the stopped state, the relay determination unit determines that the information is to be relayed.

Also, in the vehicle-vehicle communication system according to the present disclosure, if an advancing direction of a vehicle that is a transmission source of the information received by the roadside reception unit is a direction of approaching a predetermined location on a road, the relay determination unit determines that the information is to be relayed, and if the advancing direction of the vehicle that is the transmission source is a direction of moving away from the predetermined location, the relay determination unit determines that the information is not to be relayed.

Also, in the vehicle-vehicle communication system according to the present disclosure, if a position of a vehicle that is a transmission source of the information received by the roadside reception unit is within a predetermined range from a predetermined location on a road, the relay determination unit determines that the information is to be relayed, and if the position of the vehicle that is the transmission source is outside of the predetermined range from the predetermined location, the relay determination unit determines that the information is not to be relayed.

Also, in the vehicle-vehicle communication system according to the present disclosure, the relay determination unit expands and contracts the predetermined range according to the number of vehicles that are present within the predetermined range.

Also, in the vehicle-vehicle communication system according to the present disclosure, the roadside communication apparatus includes: an identification information addition unit configured to add identification information of the roadside communication apparatus to information that is to be relayed; and a relay determination unit configured to determine whether or not the information received by the roadside reception unit is to be relayed according to whether or not the identification information of the roadside communication apparatus or identification information of another roadside communication apparatus has been added to the information.

Also, in the vehicle-vehicle communication system according to the present disclosure, the roadside communication apparatus includes a transmission direction control unit configured to control, based on the information received by the roadside reception unit, a transmission direction of a wireless signal transmitted by the roadside transmission unit when relaying the information.

Also, in the vehicle-vehicle communication system according to the present disclosure, the transmission direction control unit controls the transmission direction of the wireless signal transmitted by the roadside transmission unit such that the wireless signal is transmitted in a direction along another road intersecting a road along which the vehicle that is the transmission source of the information received by the roadside reception unit travels.

Also, a roadside communication apparatus according to the present disclosure includes: a roadside reception unit configured to receive information transmitted by a vehicle using a wireless signal; and a roadside transmission unit configured to transmit information to a vehicle using a wireless signal, wherein the roadside communication apparatus relays communication between vehicles by transmitting the information received by the roadside reception unit using the roadside transmission unit.

Also, the roadside communication apparatus according to the present disclosure includes a relay determination unit configured to, based on the information received by the roadside reception unit, determine whether or not the information is to be relayed.

Also, in the roadside communication apparatus according to the present disclosure, if a vehicle that is a transmission source of the information received by the roadside reception unit is in a stopped state, the relay determination unit determines that the information is not to be relayed, and if the vehicle that is the transmission source is not in the stopped state, the relay determination unit determines that the information is to be relayed.

Also, in the roadside communication apparatus according to the present disclosure, if an advancing direction of a vehicle that is a transmission source of the information received by the roadside reception unit is a direction of approaching a predetermined location on a road, the relay determination unit determines that the information is to be relayed, and if the advancing direction of the vehicle that is the transmission source is a direction of moving away from the predetermined location, the relay determination unit determines that the information is not to be relayed.

Also, in the roadside communication apparatus according to the present disclosure, if a position of a vehicle that is a transmission source of the information received by the roadside reception unit is within a predetermined range from a predetermined location on a road, the relay determination unit determines that the information is to be relayed, and if the position of the vehicle that is the transmission source is outside of the predetermined range from the predetermined location, the relay determination unit determines that the information is not to be relayed.

Also, in the roadside communication apparatus according to the present disclosure, the relay determination unit expands and contracts the predetermined range according to the number of vehicles that are present within the predetermined range.

Also, the roadside communication apparatus according to the present disclosure includes: an identification information addition unit configured to add identification information of the roadside communication apparatus to information that is to be relayed; and a relay determination unit configured to determine whether or not the information received by the roadside reception unit is to be relayed according to whether or not the identification information of the roadside communication apparatus or identification information of another roadside communication apparatus has been added to the information.

Also, the roadside communication apparatus according to the present disclosure includes a transmission direction control unit configured to, based on the information received by the roadside reception unit, control a transmission direction of a wireless signal transmitted by the roadside transmission unit when relaying the information.

Also, in the roadside communication apparatus according to the present disclosure, the transmission direction control unit controls the transmission direction of the wireless signal transmitted by the roadside transmission unit such that the wireless signal is transmitted in a direction along another road intersecting a road along which the vehicle that is the transmission source of the information received by the roadside reception unit travels.

Also, an in-vehicle communication apparatus according to the present disclosure includes: a vehicle-side reception unit configured to receive information transmitted by another vehicle using a wireless signal and information wirelessly transmitted by a roadside communication apparatus installed on a road; a determination unit configured to determine whether or not the information received by the vehicle-side reception unit is needed; and an information processing unit configured to perform information processing based on information determined by the determination unit as being needed.

Also, in the in-vehicle communication apparatus according to the present disclosure, the determination unit determines that the information received by the vehicle-side reception unit is not needed if the information is information that is the same as information that was received previously.

Also, in the in-vehicle communication apparatus according to the present disclosure, an acquisition unit configured to acquire information relating to the vehicle; and a vehicle-side transmission unit configured to wirelessly transmit the information acquired by the acquisition unit, wherein the determination unit determines that the information received by the vehicle-side reception unit is not needed if the information is information that was transmitted by the vehicle-side transmission unit of the in-vehicle communication apparatus.

Also, in the in-vehicle communication apparatus according to the present disclosure, the information processing unit performs processing for transmitting information determined by the determination unit as being needed to another in-vehicle device mounted in the vehicle.

Also, a vehicle-vehicle communication method according to the present disclosure is a vehicle-vehicle communication method for performing wireless communication between a plurality of vehicles each having an in-vehicle communication apparatus for transmitting and receiving information by wireless signals, wherein a roadside communication apparatus installed on a road relays communication between a plurality of vehicles by receiving information transmitted by the in-vehicle communication apparatus using a wireless signal and transmitting the received information using a wireless signal.

Also, in the vehicle-vehicle communication method according to the present disclosure, the in-vehicle communication apparatus wirelessly transmits the information relating to the vehicle, and the roadside communication apparatus determines, based on the received information, whether or not the information is to be relayed.

In the present disclosure, multiple vehicles, each equipped with an in-vehicle communication apparatus that transmits and receives information using wireless signals, perform information exchange. Although each vehicle can directly transfer information with another vehicle, in the vehicle-vehicle communication system of the present disclosure, the multiple vehicles can indirectly transfer information via a roadside communication apparatus installed on a road. The roadside communication apparatus relays the transfer of information between the multiple vehicles by receiving the information transmitted by the in-vehicle communication apparatus of the vehicle using the wireless signal and transmitting the received information using the wireless signal.

In this manner, by using a configuration in which the roadside communication apparatus installed on a road can relay the transfer of information between multiple vehicles, the information transmitted from one vehicle can be received by the other vehicle directly from the one vehicle, and the information relayed by the roadside communication apparatus can be received indirectly by the other vehicle. Accordingly, for example, even in a state in which an obstruction or the like is between the vehicles and communication between the vehicles cannot be performed directly, there is a possibility that the information relayed by the roadside communication apparatus can be received. Accordingly, by using a configuration in which the roadside communication apparatus relays the transfer of the information between the vehicles, the likelihood that the communication between the vehicles can be performed can be increased even in an environment in which there are many obstructions in the surrounding area.

Also, in the present disclosure, the in-vehicle communication apparatus can directly receive the information from the in-vehicle communication apparatus mounted in the other vehicle and can indirectly receive the information from the in-vehicle communication apparatus mounted in the other vehicle via the roadside communication apparatus, and therefore, for example, there is a possibility that the same information will be received redundantly. In view of this, if information has been received from the other vehicle or the roadside communication apparatus, the in-vehicle communication apparatus determines whether or not the information is needed, and performs information processing based on information that has been determined as being needed. Accordingly, the in-vehicle communication apparatus can perform information processing excluding unneeded received information.

For example, if the received information is information that is the same as information that was received previously, the in-vehicle communication apparatus can determine that the information received in the current instance is not needed. This can occur in the case where the vehicle directly receives the transmitted information, and thereafter the same information relayed via the roadside communication apparatus is received, or the like.

Also, for example, the in-vehicle communication apparatus can determine that the information received in the current instance is not needed if the received information is information that was transmitted by the in-vehicle communication apparatus previously. This can occur in the case where the roadside communication apparatus receives the information transmitted by the in-vehicle communication apparatus and the in-vehicle communication apparatus that is the transmission source receives the information relayed by the roadside communication apparatus, or the like.

Also, in the present disclosure, the in-vehicle communication apparatus performs, as information processing, processing for transmitting the received information determined as being needed to the other in-vehicle device mounted in the vehicle. Accordingly, the in-vehicle communication apparatus receives the information transmitted from the other vehicle, the received information of the other vehicle is transmitted to the other in-vehicle device in the vehicle, and thus processing such as avoiding collision between the vehicles or warning of the approach of the other vehicle, for example, can be realized by the other in-vehicle device based on the information.

Also, in the present disclosure, the in-vehicle communication apparatus receives information relating to the vehicle, such as information on the position, vehicle speed, and advancing direction of the vehicle, the state of transmission, and/or the history of the travel route, and transmits the information to the outside of vehicle.

If multiple vehicles are present on a road, there is a risk that each vehicle will transmit its own information and the roadside communication apparatus will relay the information of the vehicles, whereby the communication amount of the wireless communication performed on the road will increase. In view of this, in the present disclosure, the roadside communication apparatus determines whether or not the information is to be relayed to the other in-vehicle communication apparatus according to the information received from the in-vehicle communication apparatus. It is sufficient that the roadside communication apparatus performs wireless transmission of only the information for which it is determined that relaying is to be performed, to the vehicle.

Accordingly, the information that is determined as not being necessary will not be relayed by the roadside communication apparatus, and therefore an increase in the communication amount of the wireless communication can be suppressed.

For example, based on the received information, the roadside communication apparatus determines whether or not the vehicle that is the transmission source of the information is in a stopped state. It is possible to determine whether or not the vehicle is in the stopped state based on information such as the vehicle speed or the state of transmission of the vehicle, for example. If the vehicle that is the transmission source is in the stopped state, the roadside communication apparatus determines that relay of the information is not to be performed, and if the vehicle that is the transmission source is not in the stopped state, the roadside communication apparatus determines that relay of the information is to be performed. Accordingly, the roadside communication apparatus can exclude the information relating to the stopped vehicle, which has a low risk of collision with the other vehicle, or the like, from the relay targets.

Also, for example, the roadside communication apparatus determines whether or not the advancing direction of the vehicle that is the transmission source of the information is the direction of approaching a predetermined location on the road, based on the received information. The predetermined location can be a location in which accidents are likely to occur, such as an intersection of roads, for example. It is possible to determine whether or not the advancing direction of the vehicle is the direction of approaching the predetermined location, based on information such as the position and the advancing direction of the vehicle, for example. If the advancing direction of the vehicle that is the transmission source is the direction of approaching the predetermined location, the roadside communication apparatus determines that relaying of the information is to be performed, and if the advancing direction is the direction of moving away from the predetermined location, the roadside communication apparatus determines that relaying of the information is not to be performed. Accordingly, the roadside communication apparatus can exclude, from the relay targets, information relating to a vehicle having a low risk of collision with another vehicle since it is moving away from a predetermined location such as an intersection of roads.

Also, for example, the roadside communication apparatus determines whether or not the position of the vehicle that is the transmission source of the information is within a predetermined range from a predetermined location on the road, based on the received information. The predetermined location can be a location at which accidents are likely to occur, such as an intersection of roads, or an installation location of the roadside communication apparatus, and the predetermined range can be a range with a radius of several hundred meters centered about the predetermined location, for example, or the like. If the position of the vehicle that is the transmission source is within the predetermined range from the predetermined location on the road, the roadside communication apparatus determines that relaying of information is to be performed, and if the position is outside of the predetermined range, the roadside communication apparatus determines that relaying of information is not to be performed. Accordingly, the roadside communication apparatus can exclude, from the relay targets, information relating to a vehicle having a low risk of collision with another vehicle since it is located away from a predetermined location such as an intersection of roads.

Note that the roadside communication apparatus may also expand and contract the predetermined range serving as the determination reference, according to the number of vehicles that are within the predetermined range. For example, if many vehicles are within the predetermined range, the roadside communication apparatus contracts the predetermined range, and if there are few vehicles, the roadside communication apparatus expands the predetermined range. Accordingly, the roadside communication apparatus can expand and contract the range in which information is relayed according to the degree of congestion of the vehicles, and thus can suppress the transmission amount resulting from an increase in the number of vehicles.

Also, in the present disclosure, if the roadside communication apparatus relays information received from a vehicle but another roadside communication apparatus is present within the coverage of the wireless signals of the roadside communication apparatus, there is a possibility that the other roadside apparatus will further relay the information of the vehicle that was relayed by the roadside communication apparatus. If this kind of situation is repeated, there is a risk that information of the vehicle will be relayed in an unnecessarily wide range.

In view of this, in the present disclosure, the roadside communication apparatus transmits information with its identification information added, when relaying information from the vehicle. If information has been received, the roadside communication apparatus determines whether or not identification information of the roadside communication apparatus or another roadside communication apparatus has been added to the information. If the identification information of the roadside communication apparatus has been added, the roadside communication apparatus determines that relaying of the information is not to be performed, and if no identification information has been added, the roadside communication apparatus determines that relaying of the information is to be performed. Accordingly, it is possible to prevent multiple roadside communication apparatuses from repeatedly relaying information transmitted by a vehicle.

Note that even if the identification information of the other roadside communication apparatus has been added to the received information, if the information is not information relating to the vehicle that was generated by the vehicle but is information such as traffic light information or traffic information, for example, which was generated by the other roadside communication apparatus, the roadside communication apparatus may also relay the information.

Also, in the present disclosure, the roadside communication apparatus has a function of controlling the transmission direction of the wireless signals. For example, by using a technique such as beam forming, the wireless signals can be narrowed down and emitted in a concentrated manner in a specific direction, and thus the roadside communication apparatus can control the transmission direction of the wireless signals.

For example, there is a high likelihood that the wireless signals transmitted by the vehicle will reach in a direction along the road on which the vehicle that is the transmission source travels, and there is a possibility that the signals will not reach due to the influence of an obstacle such as a building in a direction along another intersecting road. In view of this, it is possible to use a configuration in which the roadside communication apparatus controls the transmission direction such that the wireless signals for relaying the received information are transmitted in a direction along another road intersecting the road along which the vehicle that is the transmission source of the received information travels.

By controlling the transmission direction of the wireless signals relayed by the roadside communication apparatus in this manner, reception of unneeded information by the in-vehicle communication apparatus 10 of the vehicle can be reduced.

Advantageous Effects of Disclosure

In the case of the present disclosure, by using a configuration in which a roadside communication apparatus installed on a road relays the transfer of information between the multiple vehicles, it is possible to perform transfer of information between the vehicles via the roadside communication apparatus, even if the arrival of the wireless signals is hindered by an obstruction that is present between the vehicles.

DETAILED DESCRIPTION OF PREFERRED EMBODIMENTS

Embodiment 1

Figure 1:
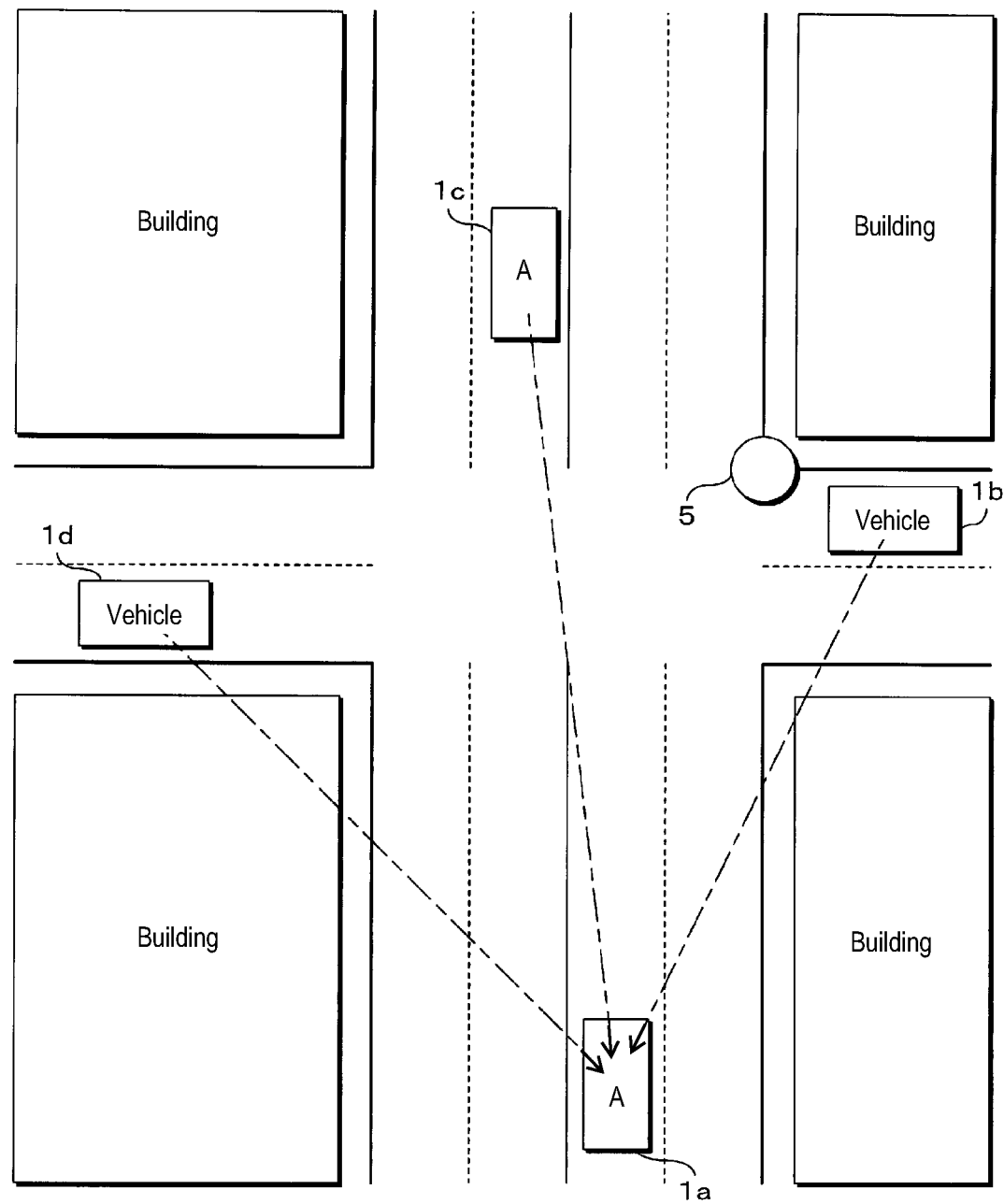
FIG. 1 is a schematic view for illustrating a vehicle-vehicle communication system according to the present embodiment.

FIGS. 1 to 4 are schematic diagrams for illustrating a vehicle-vehicle communication system according to the present embodiment. FIGS. 1 to 4 show a main road with two lanes on each side for a total of four lanes in the up-down direction, and a district road with one lane on each side for a total of two lanes, which intersects the main road, in the left-right direction. That is, FIGS. 1 to 4 illustrate a state in which an intersection at which a main road and a district road intersect is viewed from above. Also, buildings are present on both sides of each road, resulting in a so-called blind intersection. In the present example, four vehicles 1a to 1d travel from respective separate directions toward the intersection. Specifically, the vehicle 1a is on the main road on the lower side of the intersection and is traveling upward, the vehicle 1b is on the district road on the right side of the intersection and is traveling leftward, the vehicle 1c is on the main road on the upper side of the intersection and is traveling downward, and the vehicle 1d is on the district road on the left side of the intersection and is traveling rightward. Note that hereinafter, if the multiple vehicles are to be distinguished, they will be denoted by reference signs obtained by joining letters a, b, . . . to the number 1, as with the vehicles 1a, 1b, . . . , and if the vehicles are not to be distinguished, they will be denoted by a reference sign including only the number 1, as with the vehicle 1, in the description.

In the present embodiment, each vehicle 1 is equipped with an in-vehicle communication apparatus (omitted in FIGS. 1 to 4, illustrated in FIG. 5) that performs wireless communication with an apparatus outside of the vehicle by transmitting and receiving wireless signals. The in-vehicle communication apparatus of each vehicle can perform communication with the in-vehicle communication apparatus of another vehicle, or so-called vehicle-vehicle communication. For example, the in-vehicle communication apparatus of a vehicle 1 acquires the position information of that vehicle 1, generates a message including the acquired position information, and transmits the message as a wireless signal. Upon receiving a wireless signal from another vehicle, the in-vehicle communication apparatus of a vehicle 1 can acquire the position information included in the message of the received wireless signal, find out the position of the other vehicle, and perform processing such as collision avoidance.

In the example shown in FIG. 1, wireless information transmission from the three vehicles 1b to 1d to the one vehicle 1a is indicated by the one-dot chain line arrows. However, there is a risk that the buildings located between the vehicles 1b and 1d and the vehicle 1a will be obstructions and the wireless signal transmitted from the vehicle 1b and the wireless signal transmitted from the vehicle 1d will not reach the vehicle 1a. By contrast, there is a high likelihood that the wireless signal transmitted from the vehicle 1c will reach the vehicle 1a without being hindered, since there are no buildings between the vehicle 1c and the vehicle 1a.

In view of this, in the vehicle-vehicle communication system according to the present embodiment, a roadside communication apparatus 5 that relays communication between the vehicles is arranged at a suitable location on the road. For example, the roadside communication apparatus 5 is installed along with a traffic light of the intersection, and is always performing processing for distributing information relating to the lighting state of the traffic light and the like to vehicles in the surrounding area. In the example shown in the illustration, the roadside communication apparatus 5 is arranged at the upper right corner of the intersection. In the present embodiment, one roadside communication apparatus 5 is installed at one intersection, and the roadside communication apparatus 5 is arranged at a location with good visibility from each road that crosses at the intersection.

Figure 2:
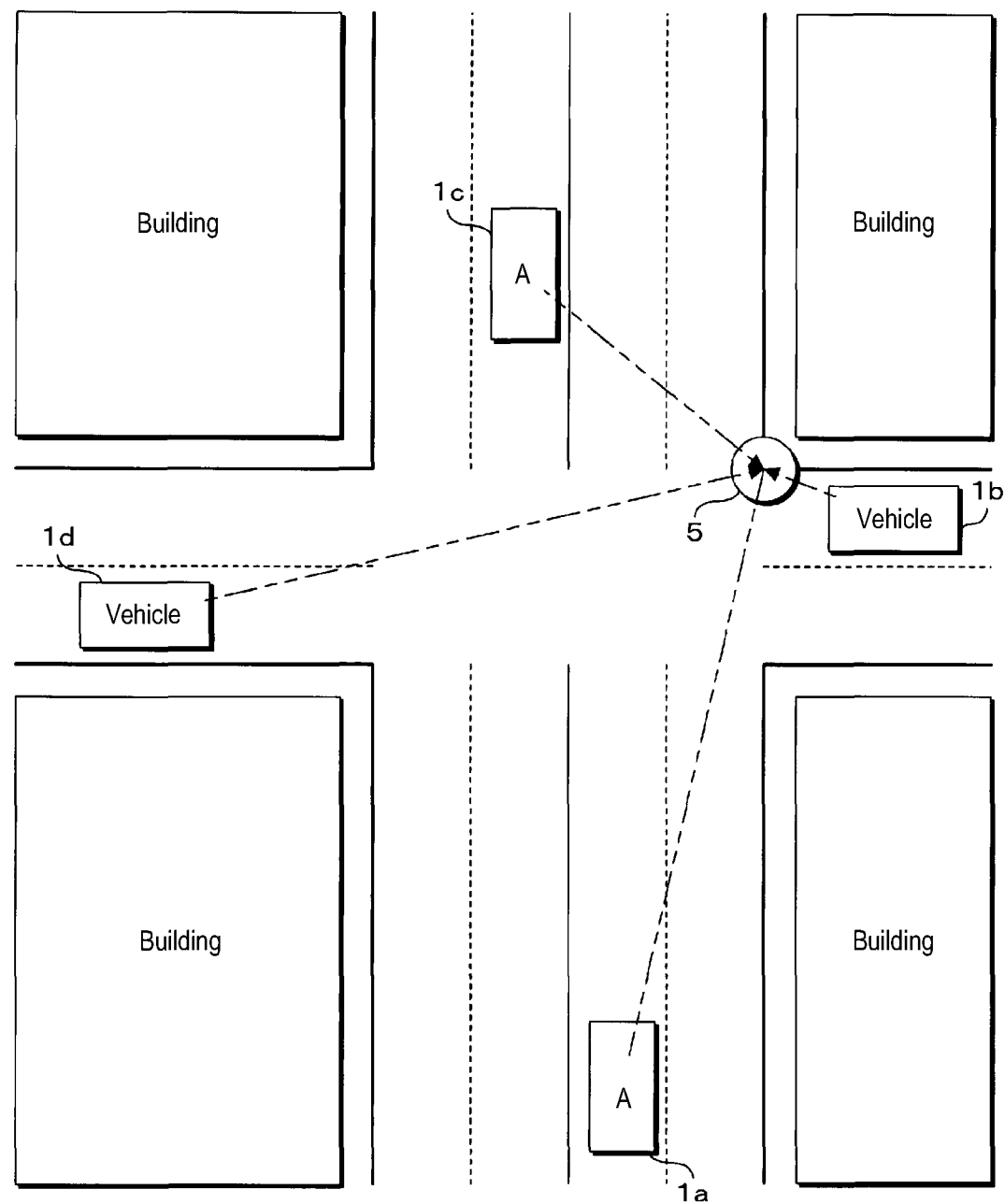
FIG. 2 is a schematic view for illustrating a vehicle-vehicle communication system according to the present embodiment.

As shown in FIG. 2, the roadside communication apparatus 5 can receive wireless signals transmitted by the three vehicles 1b to 1d. The roadside communication apparatus 5 acquires the information included in the messages of the wireless signals received from the three vehicles 1b to 1d, and transmits the messages including the acquired information to the vehicles 1a to 1d in the surrounding area as wireless signals. Alternatively, the roadside communication apparatus 5 may also transmit the received wireless signals as they are to the vehicles 1a to 1d in the surrounding area. Accordingly, the vehicle communication apparatus of the vehicle 1a can receive the information transmitted by the vehicles 1b to 1d.

Figure 3:
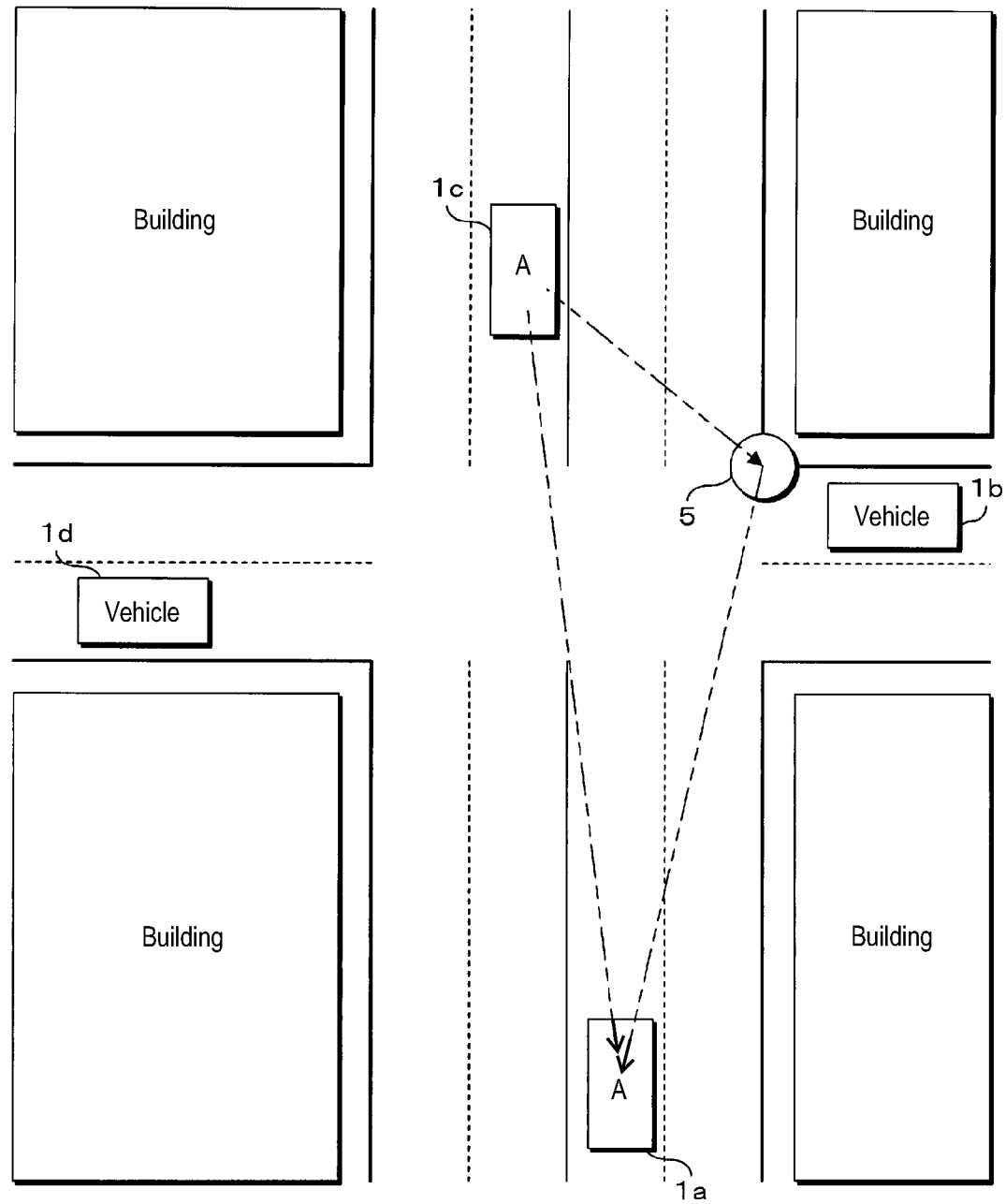
FIG. 3 is a schematic view for illustrating a vehicle-vehicle communication system according to the present embodiment.

However, as shown in FIG. 3, since there is no obstruction between the vehicle 1a and the vehicle 1c, the wireless signal transmitted from the vehicle 1c is directly received by the in-vehicle communication apparatus of the vehicle 1a. Furthermore, the in-vehicle communication apparatus of the vehicle 1a also receives the wireless signal that was transmitted from the vehicle 1c and relayed by the roadside communication apparatus 5. For this reason, the in-vehicle communication apparatus of the vehicle 1a receives information with substantially the same content multiple times. In view of this, when a wireless signal is received, the in-vehicle communication apparatus according to the present embodiment performs processing for determining whether or not the received information of the wireless signal is needed. If the information of the wireless signal received in the current instance is the same as the information of the wireless signal received previously, the in-vehicle communication apparatus determines that the information received in the current instance is not needed and discards the information.

Figure 4:
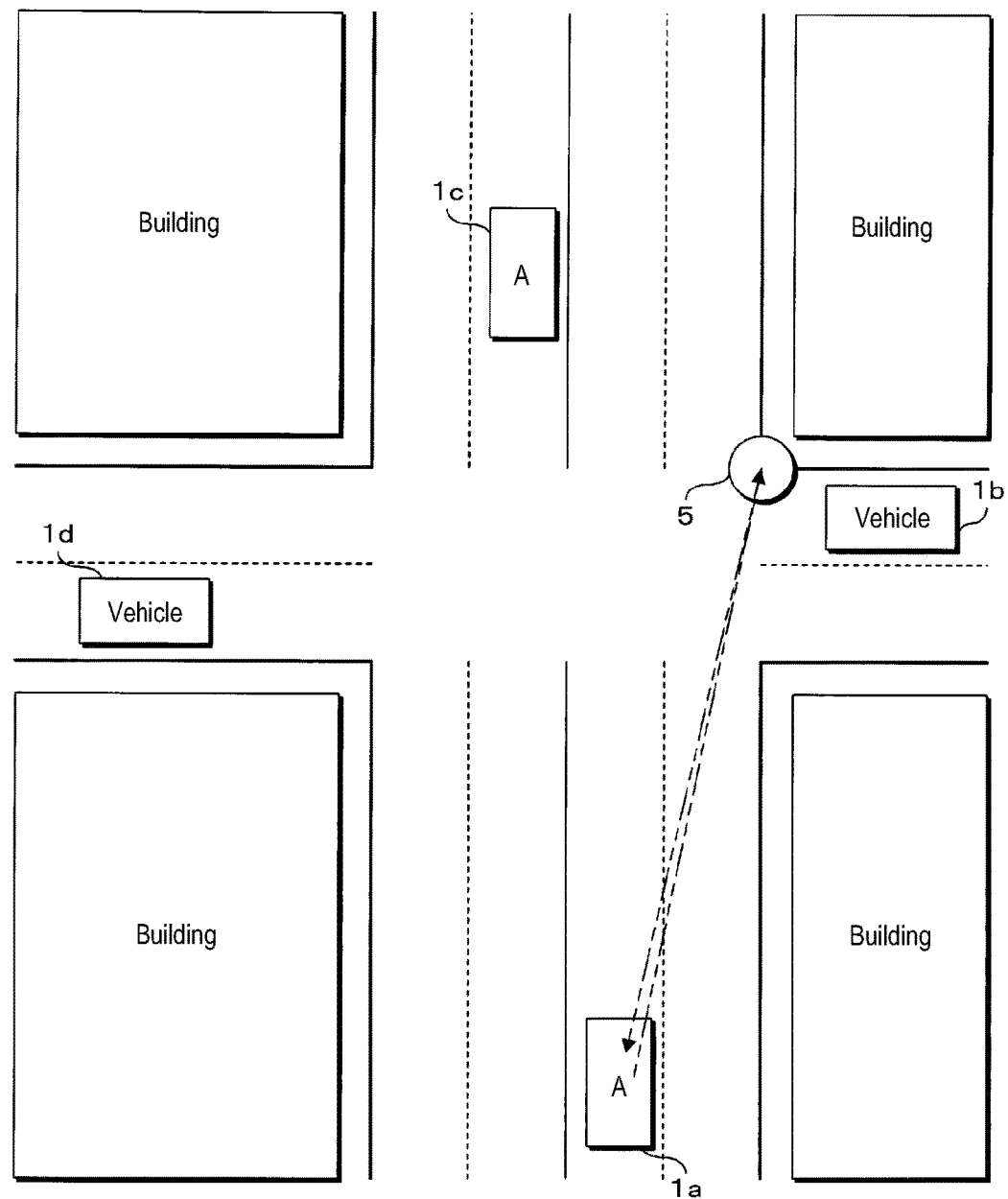
FIG. 4 is a schematic view for illustrating a vehicle-vehicle communication system according to the present embodiment.

Also, as shown in FIG. 4, the wireless signal transmitted by the vehicle 1a is received by the roadside communication apparatus 5. Upon receiving the wireless signal, the roadside communication apparatus 5 performs relaying to the vehicles 1a to 1d that are in the surrounding area. At this time, the roadside communication apparatus 5 does not transmit the wireless signal with a reception location designated, but performs simultaneous transmission, or a so-called broadcast, without designating a reception location. For this reason, the wireless signal transmitted by the roadside communication apparatus 5 is received by the vehicle 1a, and the in-vehicle communication apparatus of the vehicle 1a receives information with the same content as information it has received previously. As described above, when a wireless signal is received, the in-vehicle communication apparatus according to the present embodiment performs processing for determining whether or not the received information of the wireless signal is needed. If the information of the wireless signal received in the current instance is the same as the information of the wireless signal transmitted by the in-vehicle communication apparatus previously, the in-vehicle communication apparatus determines that the information received in the current instance is not needed and discards the information.

Note that in the present embodiment, a basic safety message conforming to the SAE J2735 standard, for example, can be used as the message exchanged between the multiple in-vehicle communication apparatuses 10 and as the message exchanged between the in-vehicle communication apparatus 10 and the roadside communication apparatus 5. However, it is also possible to use a configuration in which the in-vehicle communication apparatus 10 and the roadside communication apparatus 5 exchange a message conforming to another standard.

Figure 5:
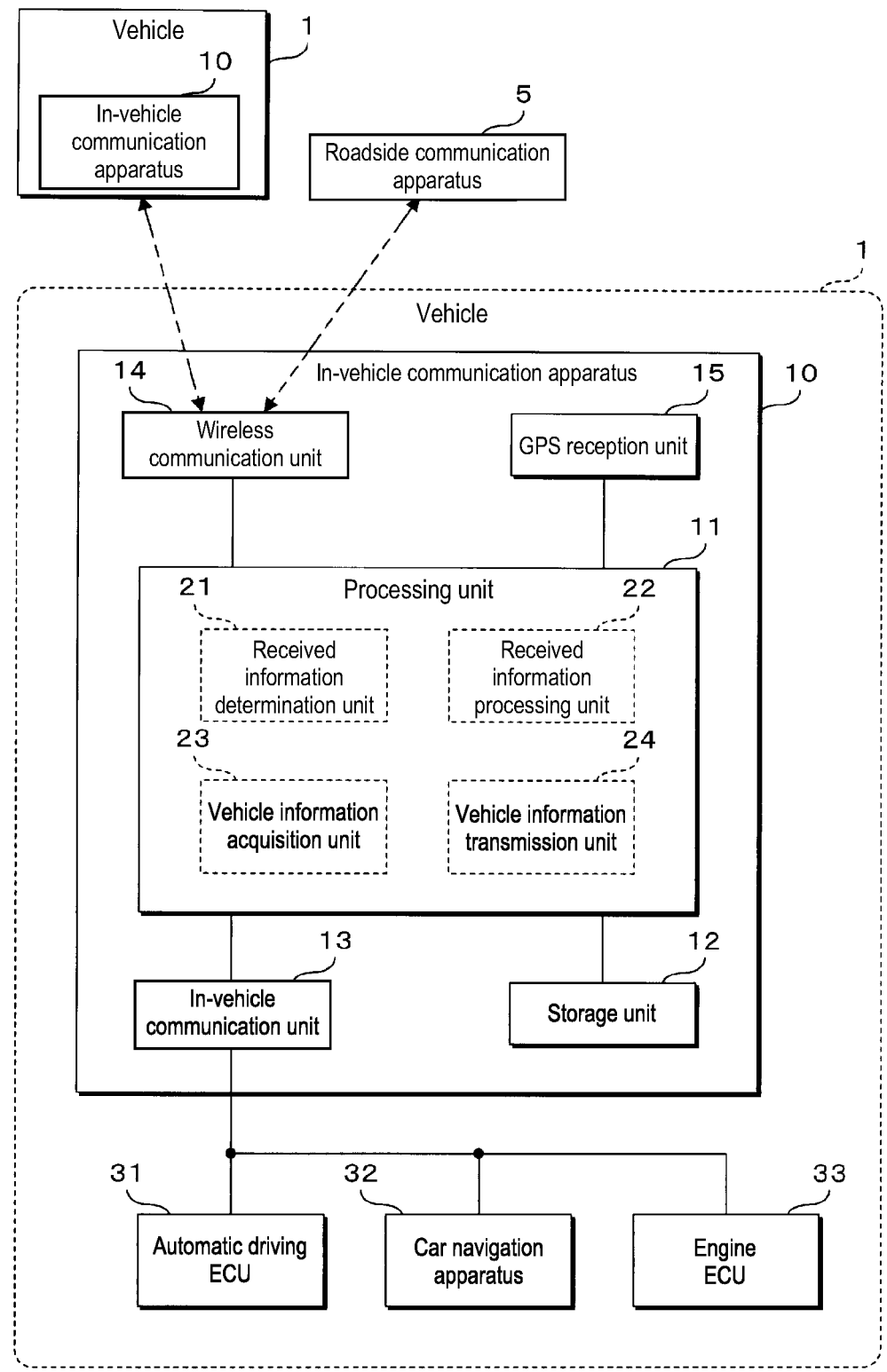
FIG. 5 is a block diagram showing a configuration of an in-vehicle communication apparatus mounted in a vehicle according to the present embodiment.

FIG. 5 is a block diagram showing a configuration of the in-vehicle communication apparatus mounted in the vehicle 1 according to the present embodiment. The in-vehicle communication apparatus 10 that performs communication with apparatuses inside and outside of the vehicle 1 is mounted in the vehicle 1 according to the present embodiment. The in-vehicle communication apparatus 10 according to the present embodiment is constituted by including a processing unit 11, a storage unit 12, an internal communication unit 13, a wireless communication unit 14, a GPS reception unit 15, and the like. The processing unit 11 is constituted using a computational processor such as a CPU (Central Processing Unit) or an MPU (Micro-Processing Unit), and performs various types of computational processing related to communication by reading out and executing programs stored in the storage unit 12, a ROM (Read-Only Memory) which is not illustrated, or the like. The storage unit 12 is constituted using a nonvolatile memory device such as an EEPROM (Electrically Erasable Programmable Read-Only Memory) or a flash memory, for example. The storage unit 12 stores programs that are executed by the processing unit 11 and various types of data that are used in processing by the processing unit 11, for example.

The internal communication unit 13 communicates with other in-vehicle devices mounted in the vehicle 1 via an internal network such as a CAN (Controller Area Network) provided within the vehicle 1. In the present example, the internal communication unit 13 communicates with in-vehicle devices such as an automatic driving ECU 31, a car navigation apparatus 32, and an engine ECU 33, which are mounted in the vehicle 1. The internal communication unit 13 performs message transmission by converting a message for transmission provided by the processing unit 11 into an electrical signal and outputting the electrical signal to a communication line constituting the internal network, receives a message by acquiring a potential of the communication line through sampling, and provides the received message to the processing unit 11.

The wireless communication unit 14 performs wireless communication with an in-vehicle communication apparatus 10 provided in another vehicle 1 and the roadside communication apparatus 5 provided on the road. The wireless communication unit 14 performs message transmission to the other in-vehicle communication apparatus 10 and the roadside communication apparatus 5 by outputting signals obtained through modulating messages for transmission provided by the processing unit 11 from an antenna, and receives messages from the other in-vehicle communication apparatus 10 and the roadside communication apparatus 5 by demodulating signals received with the antenna and provides the received data to the processing unit 11.

The GPS reception unit 15 receives wireless signals that are transmitted by GPS satellites, and provides information included in the received signals to the processing unit 11. The processing unit 11 can perform processing for calculating the position (latitude and longitude, etc.) of the vehicle 1, based on the information provided from the GPS reception unit 15.

Also, a received information acquisition unit 21, a received information processing unit 22, a vehicle information acquisition unit 23, a vehicle information transmission unit 24, and the like are realized as software-based functional blocks in the processing unit 11 of the in-vehicle communication apparatus 10 according to the present embodiment, by executing programs stored in the storage unit 12, the ROM, or the like. The received information determination unit 21 performs processing for determining whether or not the information included in the messages from the other in-vehicle communication apparatus 10 or the roadside communication apparatus 5, which were received by the wireless communication unit 14, is needed.

The processing unit 11 of the in-vehicle communication apparatus 10 stores the information that was determined as being needed by the received information determination unit 21 in the storage unit 12, among the information included in the messages received by the wireless communication unit 14. The received information determination unit 21 compares the information included in the message received by the wireless communication unit 14 and the previous received information stored in the storage unit 12, and if both pieces of information are the same, determines that the information included in the message received in the current instance is not needed and discards the information. If received information that is the same as the information included in the received message has not been stored in the storage unit 12, the received information determination unit 21 determines that the information included in the message received in the current instance is needed and stores the information in the storage unit 12.

Also, the processing unit 11 of the in-vehicle communication apparatus 10 stores the information included in the messages transmitted to the outside by the wireless communication unit 14 in the information unit 12 over a predetermined period and erases the information from the storage unit 12 upon the elapse of the predetermined period. The received information determination unit 21 compares the information included in the message received by the wireless communication unit 14 and the previous transmitted information stored in the storage unit 12, and if both pieces of information are the same, determines that the information included in the message received in the current instance is not needed and discards the information. If transmitted information that is the same as the information included in the received message has not been stored in the storage unit 12, the received information determination unit 21 determines that the information included in the message received in the current instance is needed and stores the information in the storage unit 12.

The received information processing unit 22 performs various types of information processing on the received information that was determined as being needed by the received information determination unit 21 and stored in the storage unit 12. In the present embodiment, the received information processing unit 22 performs processing for reading out the information from the storage unit 12, and transmitting the read-out information to the automatic driving ECU 31, the car navigation apparatus 32, the engine ECU 33, or the like in the vehicle 1 using the in-vehicle communication unit 13. Note that the received information stored in the storage unit 12 is transmitted to the vehicle interior by the received information processing unit 22 and is erased upon the elapse of the predetermined period. This is because there is a possibility that the received information stored in the storage unit 12 will be used in the determination performed by the received information determination unit 21.

The vehicle information acquisition unit 23 performs processing for acquiring predetermined vehicle information to be transmitted to the outside of the vehicle by the wireless communication unit 14, based on information obtained through transmission performed by the internal communication unit 13 via an internal network, and information obtained from the GPS reception unit 15. In the present embodiment, the vehicle information acquisition unit 23 acquires the position information of the vehicle 1 based on the information from the GPS reception unit 15. Also, the vehicle information acquisition unit 23 may acquire information such as the speed or acceleration of the vehicle 1, for example, through the internal communication performed by the internal communication unit 13.

The vehicle information transmission unit 24 performs processing for transmitting the vehicle information received by the vehicle information acquisition unit 23 to another in-vehicle communication apparatus 10 and the roadside communication apparatus 5 using the wireless communication unit 14. Acquisition of the vehicle information by the vehicle information acquisition unit 23 and transmission of the vehicle information performed by the vehicle information transmission unit 24 are performed with a predetermined period, such as every second or every minute, for example. Also, transmission of the vehicle information by the vehicle information transmission unit 24 is performed repeatedly with the predetermined period, regardless of whether or not the other in-vehicle communication apparatus 10 or the roadside communication apparatus 5 is within the coverage of the wireless signal transmitted by the wireless communication unit 14.

Figure 6:
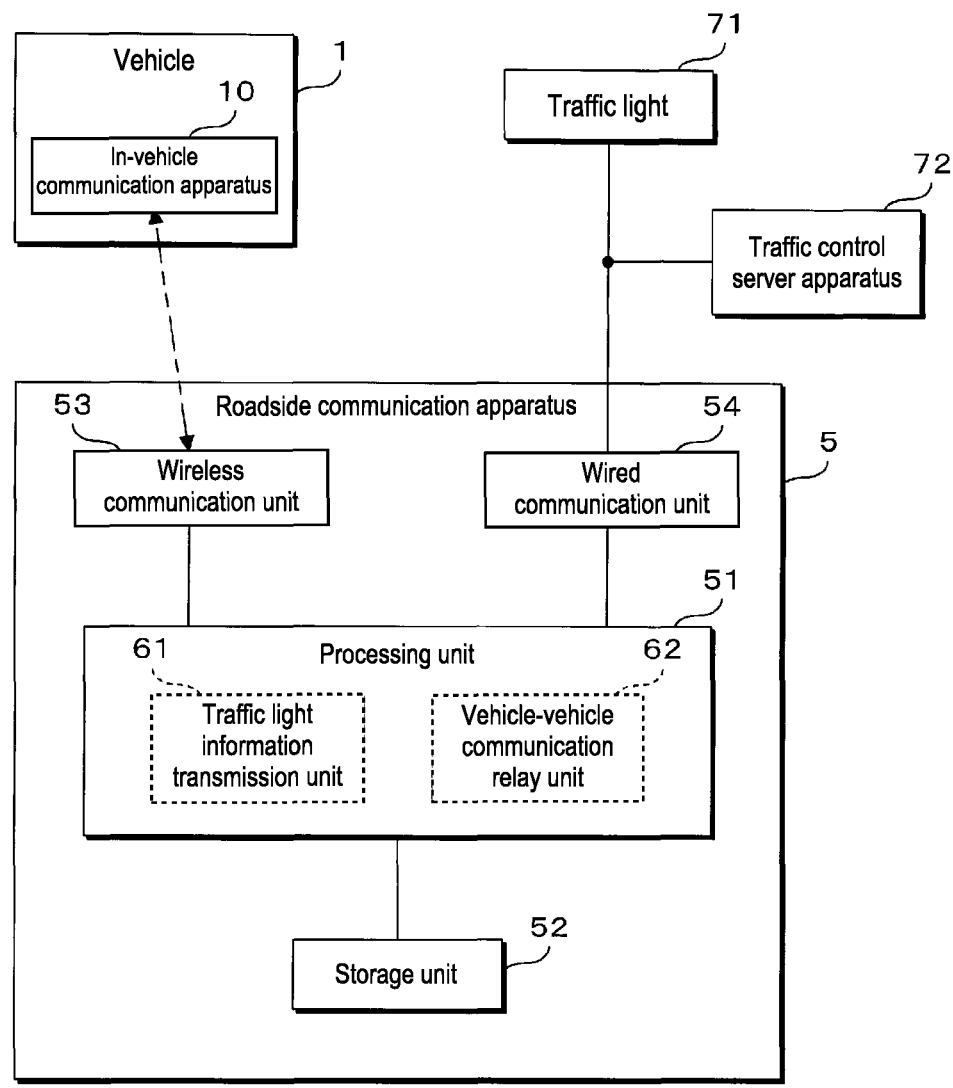
FIG. 6 is a block diagram showing a configuration of a roadside communication apparatus according to the present embodiment.

FIG. 6 is a block diagram showing a configuration of the roadside communication apparatus 5 according to the present embodiment. The roadside communication apparatus 5 according to the present embodiment is constituted by including a processing unit 51, a storage unit 52, a wireless communication unit 53, a wired communication unit 54, and the like. The processing unit 51 is constituted using a computational processor such as a CPU and performs various types of computational processing for communication. For example, the processing unit 51 performs processing for receiving information relating to the lighting state of the traffic light 71, processing for acquiring traffic congestion information of the roads in the surrounding area from a traffic control server apparatus 72, processing for simultaneously transmitting the acquired information to the vehicles 1, and the like. Also, the roadside communication apparatus 5 according to the present embodiment performs processing for relaying the vehicle-vehicle communication performed between the multiple vehicles 1.

The storage unit 52 is constituted using a storage apparatus such as a DRAM (Dynamic Random Access Memory), a flash memory, or a hard disk. The storage unit 52 temporarily stores the information exchanged by the roadside communication apparatus 5, such as the information received by the wireless communication unit 53 from the vehicles 1, the information received by the wired communication unit 54 from the traffic light 71, the traffic control server apparatus 72, or the like.

The wireless communication unit 53 performs wireless communication with the in-vehicle communication apparatus 10 mounted in the vehicle 1. The wireless communication unit 53 performs message transmission to the in-vehicle communication apparatus 10 by outputting a signal obtained by modulating a message for transmission provided from the processing unit 51 from an antenna, receives the message from the in-vehicle communication apparatus 10 by demodulating the signal received by the antenna, and provides the received message to the processing unit 51.

The wired communication unit 54 performs communication with the traffic light 71 connected via a communication line, for example, and performs communication with the traffic control server apparatus 72 operated by a traffic management center via a network such as the Internet, for example. The wired communication unit 54 transmits a message for transmission provided by the processing unit 51 to the traffic control server apparatus 72 or the like, receives a message from the traffic light 71, the traffic control server apparatus 72, or the like, and provides the message to the processing unit 51.

Also, functional blocks such as a traffic light information transmission unit 61 and a vehicle-vehicle communication relay unit 62 are provided in the processing unit 51 of the roadside communication apparatus 5 according to the present embodiment. The traffic light information transmission unit 61 performs processing for generating a message including information obtained from the traffic light 71 via the wired communication unit 54, such as the lighting state of the traffic light 71 and the amount of time until a switch is made to another lighting state, and for simultaneously transmitting the generated message to the vehicles 1 in the surrounding area using the wireless communication unit 53. Transmission of the traffic light information performed by the traffic light information transmission unit 61 is performed with a predetermined period, such as every second or every minute, for example. Note that in the present embodiment, a configuration was used in which the roadside communication apparatus 5 transmits the information on the traffic light 71, there is no limitation to this, and for example, the roadside communication apparatus 5 may transmit various types of information, such as traffic congestion information or accident information.

The vehicle-vehicle communication relay unit 62 performs relaying of messages by re-transmitting the messages transmitted to the other vehicle 1 to the wireless communication unit 53, among the messages from the vehicles 1 received by the wireless communication unit 53. The messages transmitted by the vehicles 1 include messages transmitted to the other vehicles 1 in so-called vehicle-vehicle communication, and messages transmitted to the roadside communication apparatus 5 in so-called road-vehicle communication. In the present embodiment, both types of message can be distinguished by the message IDs included in the messages, for example. If a message transmitted to the roadside communication apparatus 5 is received by the wireless communication unit 53, the processing unit 51 performs processing for transmitting the information included in the received message to the traffic control server apparatus 72 using the wired communication unit 54, for example. If a message transmitted to the other vehicle 1 is received by the wireless communication unit 53, the vehicle-vehicle communication relay unit 62 simultaneously transmits the message to the vehicles 1 in the surrounding area by generating a message for transmission including the information included in the received message and providing the message to the wireless communication unit 53.

Figure 7:
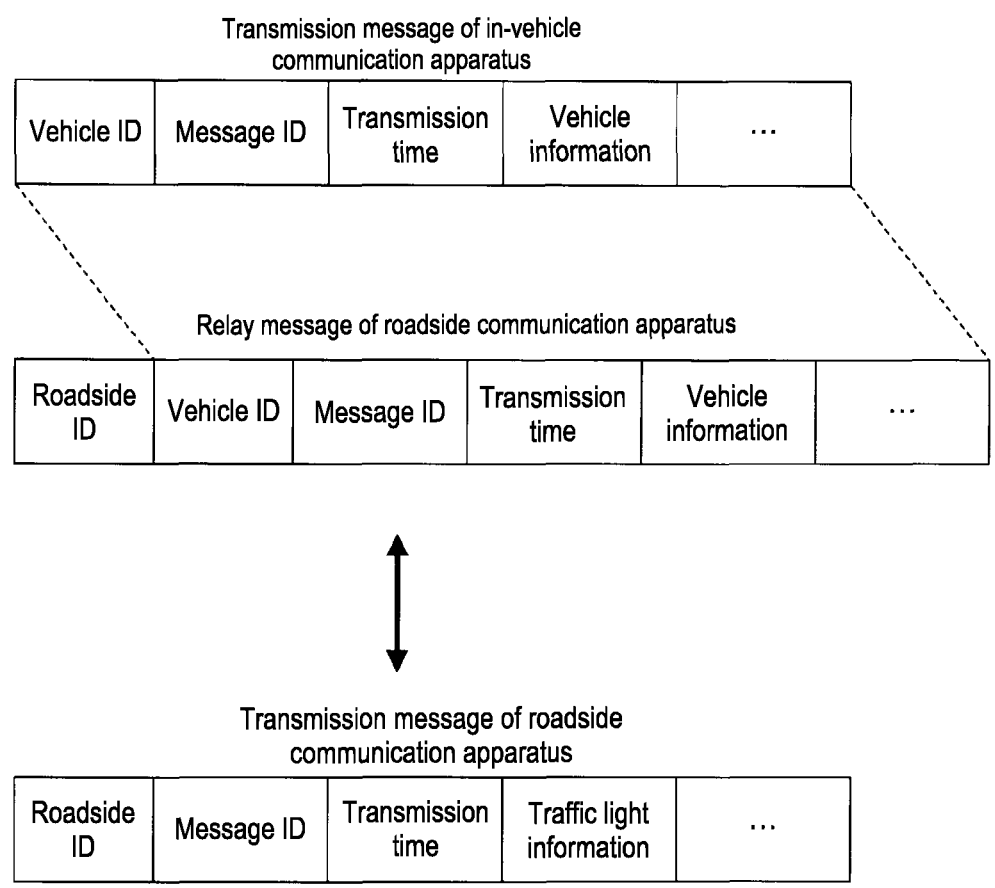
FIG. 7 is a schematic diagram showing an example of a message transmitted and received using wireless signals in the present embodiment.

FIG. 7 is a schematic diagram showing an example of a message to be exchanged by a wireless signal in the present embodiment. The message to be wirelessly transmitted by the in-vehicle communication apparatus 10 according to the present embodiment to the other vehicle 1 includes information such as a vehicle ID, a message ID, a transmission time, and vehicle information (see the upper portion of FIG. 7). The vehicle ID is identification information that is uniquely assigned to a vehicle 1. The message ID is identification information that is determined in advance for the type of the vehicle information. The transmission time is information on the time at which the in-vehicle communication apparatus 10 transmits a message. Note that values such as a count value that is incremented each time message transmission is performed, for example, may also be included in the message instead of the transmission time. The vehicle information is various types of information within the vehicle 1, which are acquired by the vehicle information acquisition unit 23, and for example, is position information and the like of the vehicle 1.

The roadside communication apparatus 5 stores the message IDs attached to the messages transmitted by the in-vehicle communication apparatus 10 of the vehicle 1 and information regarding whether or not the message is to be relayed to the other vehicle 1, in association with each other in a form such as a table. If the message from the in-vehicle communication apparatus 10 is received by the wireless communication unit 53, the roadside communication apparatus 5 acquires the message ID included in the message, and references the stored table to determine whether or not the message is to be relayed. If it is determined that the message is to be relayed, the roadside communication apparatus 5 generates a message for relaying based on the message received from the in-vehicle communication apparatus 10.

The relay message generated by the roadside communication apparatus 5 includes information such as the roadside ID, the vehicle ID, the message ID, the transmission time, and the vehicle information, for example (see the central portion of FIG. 7). The roadside ID is identification information that is uniquely assigned to the roadside communication apparatus 5. The vehicle ID, the message ID, the transmission time, the vehicle information, and the like are the same as those in the message received from the in-vehicle communication apparatus 10. The transmission time included in the relay message is the time at which the original message was transmitted by the in-vehicle communication apparatus 10 and is not the time at which the roadside communication apparatus 5 is to transmit the message. In other words, the roadside communication apparatus 5 sets the message obtained by attaching its own roadside ID to the message received from the in-vehicle communication apparatus 10 as the relay message, and transmits the relay message to the vehicles 1 in the surrounding area using the wireless communication unit 53.

Also, the roadside communication apparatus 5 according to the present embodiment performs processing for periodically transmitting information such as the lighting state of the traffic light 71 to the vehicles 1 in the surrounding area. In this case, information such as the roadside ID, the message ID, the transmission time, and the traffic light information, for example, is included in the message to be wirelessly transmitted by the roadside communication apparatus 5 to the vehicles 1 in the surrounding area (see the lower portion of FIG. 7). As described above, the roadside ID is identification information that is uniquely assigned to the roadside communication apparatus 5. The message ID is identification information that is determined in advance for the type of information to be transmitted by the roadside communication apparatus 5, and the message ID is preferably set so as not to be the same as the message ID attached to the message to be transmitted by the in-vehicle communication apparatus 10. The transmission time is information on the time at which the roadside communication apparatus 5 transmits the message. The traffic light information is information such as the lighting state acquired from the traffic light 71 via the wired communication unit 54.

Figure 8:
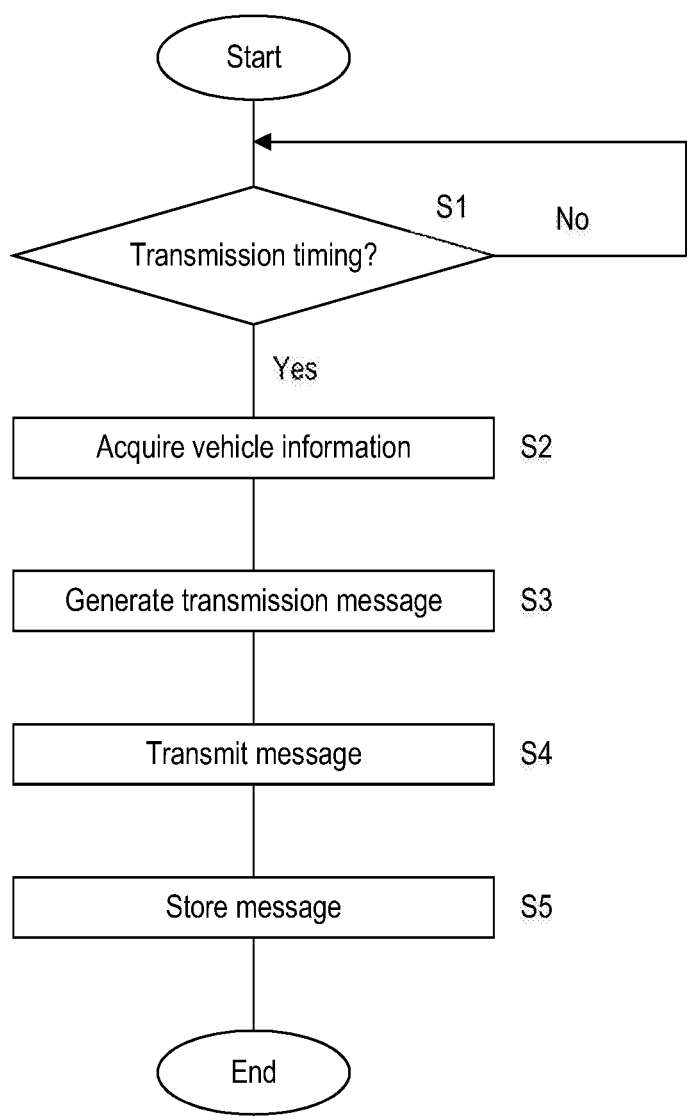
FIG. 8 is a flowchart showing a procedure of vehicle information transmission processing performed by the in-vehicle communication apparatus according to the present embodiment.

FIG. 8 is a flowchart showing a procedure of vehicle information transmission processing performed by the in-vehicle communication apparatus 10 according to the present embodiment. The in-vehicle communication apparatus 10 according to the present embodiment repeatedly performs the processing for transmitting the vehicle information of the vehicle 1 to the other vehicle 1 or the roadside communication apparatus 5, with a predetermined period. The processing unit 11 of the in-vehicle communication apparatus 10 determines whether or not the timing of transmitting the vehicle information to the outside of the vehicle has been reached (step S1). If the timing of transmitting the vehicle information has not been reached (S1: NO), the processing unit 11 waits until the timing of transmitting the vehicle information is reached.

If the timing of transmitting the vehicle information has been reached (S1: YES), the vehicle information acquisition unit 23 of the processing unit 11 acquires, as the vehicle information, the position information of the vehicle 1 obtained based on the signal received by the GPS reception unit 15 and various types of information received from the other in-vehicle devices in the vehicle 1 via the internal communication unit 13 (step S2). Next, the vehicle information transmission unit 24 of the processing unit 11 attaches information such as the vehicle ID, the message ID, and the transmission time to the vehicle information acquired in step S2 and thereby generates the transmission message (step S3). The vehicle information transmission unit 24 transmits the generated message using the wireless communication unit 14 (step S4). Also, the processing unit 11 stores the message received by the vehicle information transmission unit 24 in the storage unit 12 (step S5) and ends the processing.

Figure 9:
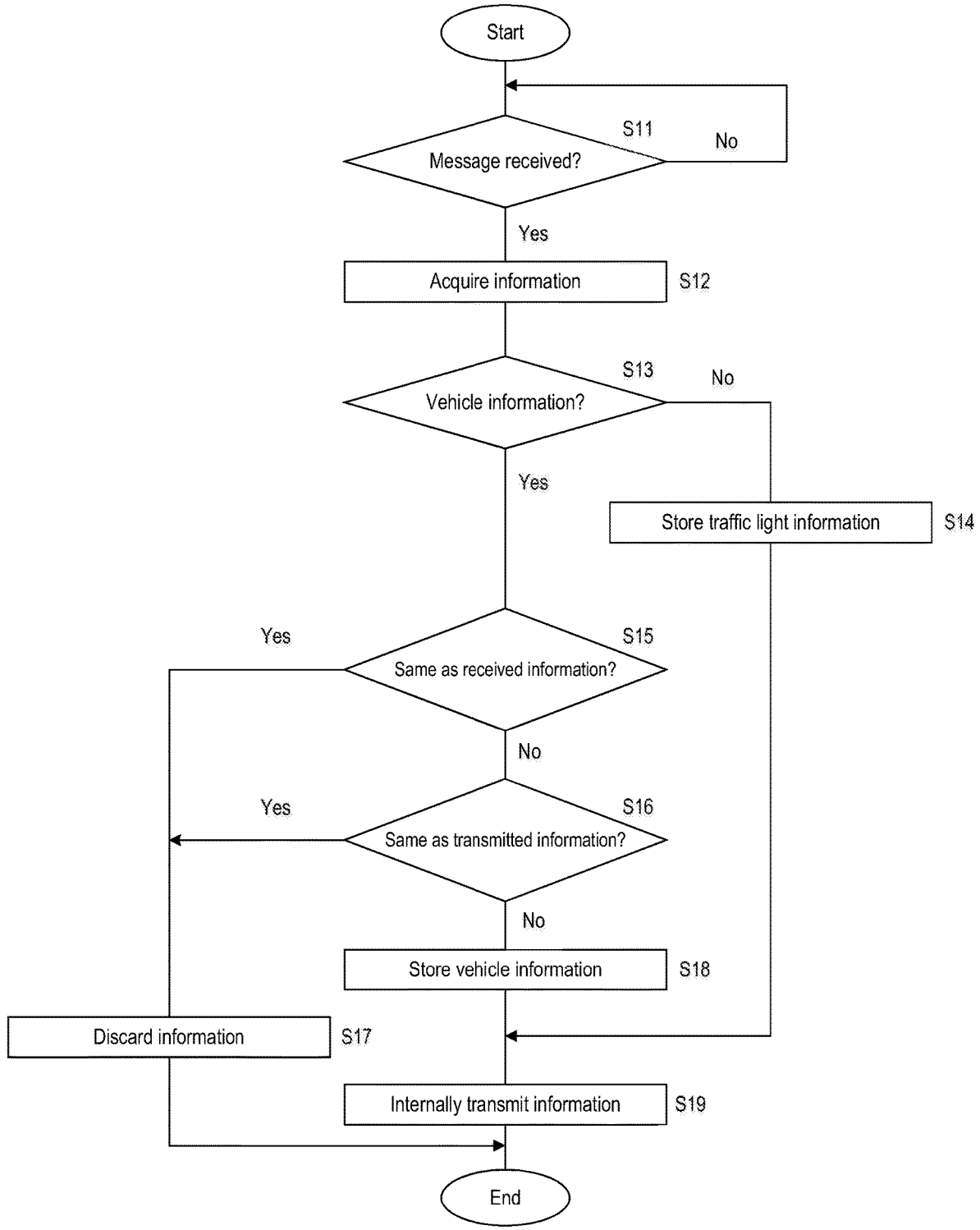
FIG. 9 is a flowchart showing a procedure of information reception processing performed by the in-vehicle communication apparatus according to the present embodiment.

FIG. 9 is a flowchart showing a procedure of information reception processing performed by the in-vehicle communication apparatus 10 according to the present embodiment. The processing unit 11 of the in-vehicle communication apparatus 10 according to the present embodiment determines whether or not a message transmitted using wireless signals has been received by the wireless communication unit 53 (step S11). If no message has been received (S11: NO), the processing unit 11 waits until the message is received. If the message has been received (S11: YES), the received information determination unit 21 of the processing unit 11 acquires the information included in the received message (step S12).

Next, the received information determination unit 21 determines whether or not the acquired received information is the vehicle information (step S13). The received information determination unit 21 can determine whether or not the received information is the vehicle information based on the message ID included in the received message. If the received information is not the vehicle information (S13: NO), that is, if the received information is the traffic light information, the received information determination unit 21 stores the received traffic light information in the storage unit 12 (step S14) and advances the processing to step S19. Note that in the present example, the information included in the message received by the in-vehicle communication apparatus 10 is either the vehicle information transmitted by the vehicle 1 or the traffic light information transmitted by the roadside communication apparatus 5. The in-vehicle communication apparatus 10 may also receive other information.

If the received information is the vehicle information (S13: YES), the received information determination unit 21 compares the received information and the previous received information stored in the storage unit 12 and determines whether or not the received information of the current instance is the same as the previous received information (step S15). The received information determination unit 21 can determine whether or not the received information is the same by comparing information such as the vehicle ID, the message ID, and the transmission time included in the received message. If the received information of the current instance is the same as the previous received information (S15: YES), the processing unit 11 discards the received information of the current instance (step S17) and ends the processing.

If the received information of the present instance is not the same as the previous received information (S15: NO), the received information determination unit 21 compares the received information of the current instance and the information included in the transmitted message stored in the storage unit 12, and determines whether or not the information of the current instance is the same as the transmitted message of the received information determination unit 21 (step S16). If the information of the current instance is the same as the transmitted information (S16: YES), the processing unit 11 discards the received information of the current instance (step S17) and ends the processing.

If the received information of the current instance is not the same as the transmitted information (S16: NO), the processing unit 11 stores the vehicle information received in the current instance in the storage unit 12 (step S18). Next, the received information processing unit 22 of the processing unit 11 reads out the traffic light information stored in step S14 or the vehicle information stored in step S18 from the storage unit 12, transmits the read-out information to the other in-vehicle devices in the vehicle 1 using the internal communication unit 13 (step S19), and ends the processing.

Figure 10:
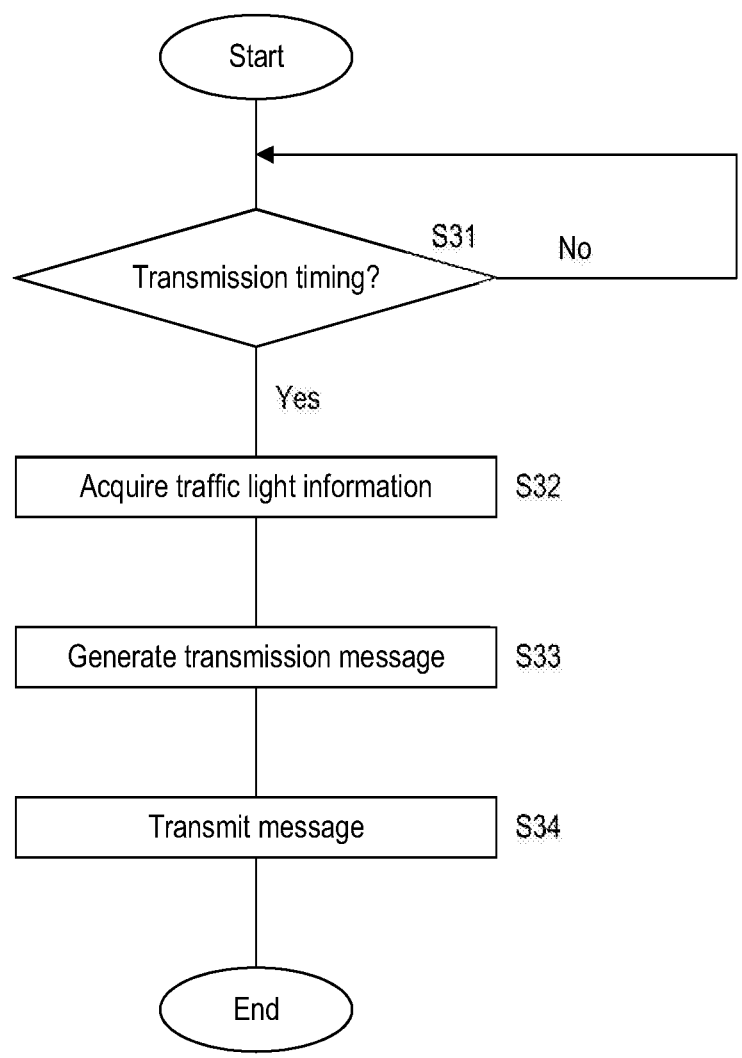
FIG. 10 is a flowchart showing a procedure of traffic light information transmission processing performed by the roadside communication apparatus according to the present embodiment.

FIG. 10 is a flowchart showing a procedure of traffic light information transmission processing performed by the roadside communication apparatus 5 according to the present embodiment. The roadside communication apparatus 5 according to the present embodiment repeatedly performs processing for transmitting the traffic light information such as the lighting state of the traffic light 71 to the vehicles 1 in the surrounding area, with a predetermined period. The traffic light information transmission unit 61 of the processing unit 51 of the roadside communication apparatus 5 determines whether or not the timing of transmitting the traffic light information to the vehicle 1 has been reached (step S31). If the timing of transmitting the traffic light information has not been reached (S31: NO), the traffic light information transmission unit 61 waits until the timing of transmitting the traffic light information is reached.

If the timing of transmitting the traffic light information has been reached (S31: YES), the traffic light information transmission unit 61 acquires traffic light information such as the lighting state of the traffic light 71 using the wired communication unit 54 (step S32). Next, the traffic light information transmission unit 61 generates the transmission message by attaching information such as the roadside ID, the message ID, and the transmission time to the traffic light information acquired in step S32 (step S33). The traffic light information transmission unit 61 transmits the generated message using the wireless communication unit 53 (step S34) and ends the processing.

Figure 11:
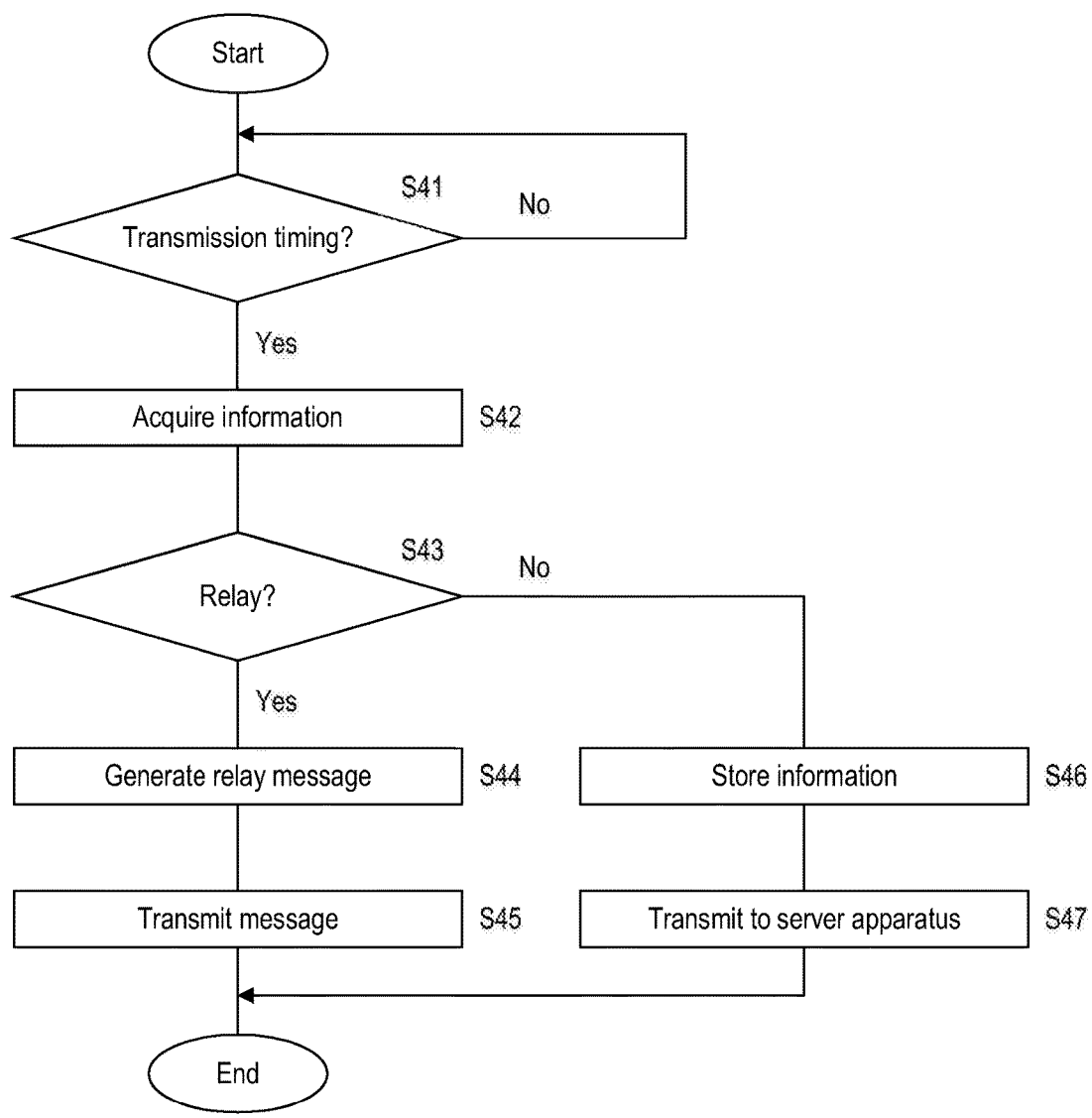
FIG. 11 is a flowchart showing a procedure of information reception processing performed by the roadside communication apparatus according to the present embodiment.

FIG. 11 is a flowchart showing a procedure of information reception processing performed by the roadside communication apparatus 5 according to the present embodiment. The processing unit 51 of the roadside communication apparatus 5 according to the present embodiment determines whether or not the message from the vehicle 1 has been received by the wireless communication unit 53 (step S41). If no message from the vehicle 1 has been received (S41: NO), the processing unit 51 waits until a message is received. If a message has been received (S41: YES), the received information determination unit 51 acquires the information included in the received message (step S42).

Next, the processing unit 51 determines whether or not the information acquired in step S42 is information that is to be relayed to the vehicles 1 in the surrounding area (step S43). If the acquired information is information that is to be relayed (S43: YES), the vehicle-vehicle communication relay unit 62 of the processing unit 51 generates a message for relaying based on the information acquired in step S42 (step S44). The vehicle-vehicle communication relay unit 62 transmits the generated relay message to the vehicles 1 in the surrounding area using the wireless communication unit 53 (step S45) and ends the processing. If the acquired information is not information that is to be relayed (S43: NO), the processing unit 51 stores the information acquired in step S42 in the storage unit 52 (step S46). The processing unit 51 transmits the information stored in the storage unit 52 as appropriate to the traffic control server apparatus 72 and the like using the wired communication unit 54 (step S47), and ends the processing.

The vehicle-vehicle communication system according to the present embodiment with the above-described configuration is a system in which multiple vehicles 1 equipped with in-vehicle communication apparatuses 10 that exchange information using wireless signals perform wireless communication, and thereby exchange information. Although each vehicle 1 can wirelessly exchange information directly with another vehicle 1, in the vehicle-vehicle communication system according to the present embodiment, the multiple vehicles 1 can indirectly exchange information via a roadside communication apparatus 5 installed on a road. The roadside communication apparatus 5 receives the information transmitted using wireless signals by the in-vehicle communication apparatus 10 of the vehicle 1 and transmits the received information to the vehicles 1 in the surrounding area using the wireless signals, and thereby relays the transfer of information between the multiple vehicles 1.

In this manner, by using a configuration in which the roadside communication apparatus 5 installed on the road can relay the transfer of information between the multiple vehicles 1, the information transmitted from one vehicle 1 can be received by another vehicle 1 directly from the one vehicle 1, and the information relayed by the roadside communication apparatus 5 can be received indirectly by the other vehicle 1. Accordingly, even in a state in which there is an obstruction between the multiple vehicles 1 and wireless communication between the vehicles 1 cannot be performed directly, for example, there is a possibility that the information relayed by the roadside communication apparatus 5 can be received. Accordingly, by using a configuration in which the roadside communication apparatus 5 relays the transfer of the information between the vehicles 1, it is possible to increase the likelihood that the communication between the vehicles 1 can be performed even in an environment in which many obstructions are present in the surrounding area.

The in-vehicle communication apparatus 10 according to the present embodiment can receive information directly from an in-vehicle communication apparatus 10 mounted in another vehicle 1 and can receive information indirectly via the roadside communication apparatus 5 from an in-vehicle communication apparatus 10 mounted in another vehicle 1, and therefore there is a possibility that the same information will be received redundantly. In view of this, if information is received from the other vehicle 1 or the roadside communication apparatus 5, the in-vehicle communication apparatus 10 determines whether or not the information is needed, and performs information processing based on the information that is determined as being needed. Accordingly, the in-vehicle communication apparatus 10 can perform information processing excluding the unneeded received information.

For example, if the received information is information that is the same as information that was received previously, the in-vehicle communication apparatus 10 can determine that the information received in the current instance is not needed. This can occur in the case where the information transmitted by the other vehicle 1 is received directly, and thereafter the same information relayed via the roadside communication apparatus 5 is received, or the like.

Also, for example, the in-vehicle communication apparatus 10 can determine that the information received in the current instance is not needed if the received information is information that was transmitted by the in-vehicle communication apparatus 10 previously. This can occur in the case where the roadside communication apparatus 5 receives the information transmitted by the in-vehicle communication apparatus 10 and the in-vehicle communication apparatus 10 that is the transmission source receives the information relayed by the roadside communication apparatus 5, or the like.

Note that in the present embodiment, the message transmitted by the in-vehicle communication apparatus 10 and the message transmitted by the roadside communication apparatus 5 that relays the message are not completely identical pieces of data, as shown in FIG. 7. For example, if the roadside ID, which is the identification information of the roadside communication apparatus 5, is attached to the original message transmitted by the in-vehicle communication apparatus 10 or if an error detection reference sign or the like is attached to the message, there is a possibility that the reference sign of the message relayed and transmitted by the roadside communication apparatus 5 will change. In the present embodiment, if the in-vehicle communication apparatus 10 determines whether or not the received information and the stored information are the same, it is sufficient that the in-vehicle communication apparatus 10 determines whether or not some of the information included in the message (information such as the vehicle ID, the message ID, the transmission time, and the vehicle information) is the same, excluding information such as the header and the footer that accompany the message.

The in-vehicle communication apparatus 10 according to the present embodiment performs processing for transmitting the received information that was determined as being needed to the in-vehicle devices such as the automatic driving ECU 31, the car navigation apparatus 32, and the engine ECU 33, which are mounted in the vehicle 1. Accordingly, the in-vehicle communication apparatus 10 can receive the information transmitted from the other vehicle 1, transmit the received information of the other vehicle 1, and based on this information, the in-vehicle devices can perform processing such as collision avoidance between the vehicles and warning of the approach of the other vehicle 1.

Note that in the present embodiment, a configuration was used in which the roadside communication apparatus 5 transmits the traffic light information such as the lighting state of the traffic light 71 to the vehicles 1 in the surrounding area, but there is no limitation thereto. The roadside communication apparatus 5 may also be configured to transmit information other than the traffic light information, such as traffic information, traffic congestion information, and accident information of the road, for example, to the vehicle 1. Furthermore, the roadside communication apparatus 5 may also be configured to simply perform only relaying of vehicle-vehicle communication without performing transmission of these pieces of information.

Also, the in-vehicle communication apparatus 10 was configured to transmit the information received from the other vehicle 1 to the automatic driving ECU 31, the car navigation apparatus 32, the engine ECU 33, and the like. The in-vehicle communication apparatus 10 may be configured to transmit the information to other in-vehicle devices, may be further configured not to transmit the received information to the other in-vehicle devices, but to perform computational processing or the like using the received information, and may also be configured to transmit the result of the computational processing to the other in-vehicle devices. Also, the configuration of the message shown in FIG. 7 is an example and there is no limitation thereto.

Embodiment 2

Figure 12:
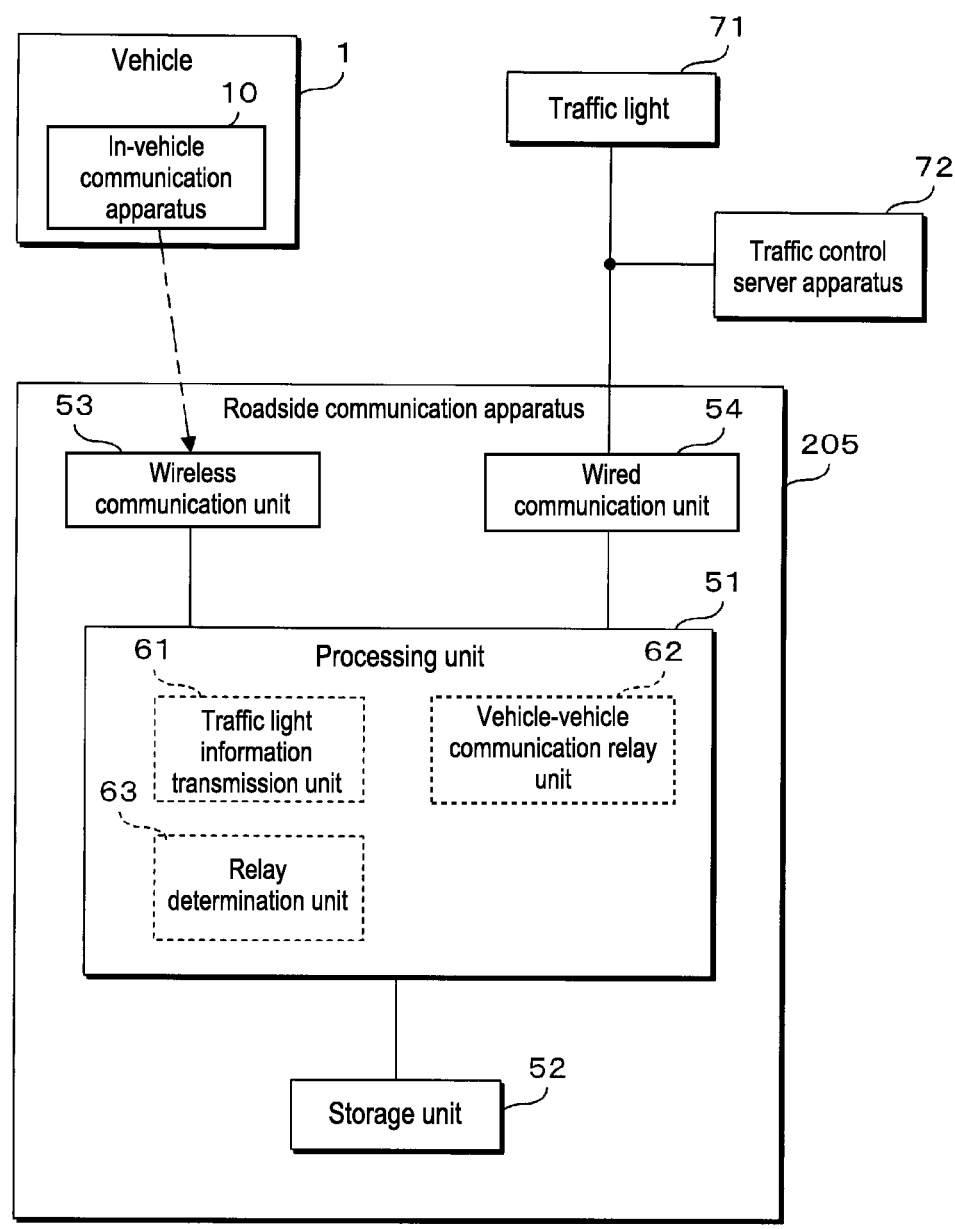
FIG. 12 is a block diagram showing a configuration of a roadside communication apparatus according to Embodiment 2.

The vehicle-vehicle communication system according to Embodiment 2 is configured to have a function of performing determination of whether or not to relay a message when the roadside communication apparatus that relays communication between the vehicles 1 receives a message from the in-vehicle communication apparatus 10 of the vehicle 1. FIG. 12 is a block diagram showing a configuration of a roadside communication apparatus 205 according to Embodiment 2. The roadside communication apparatus 205 according to Embodiment 2 has a configuration in which the functional block of a relay determination unit 63 has been added to the processing unit 51 in the roadside communication apparatus 5 according to Embodiment 1.

If a message from the vehicle 1 is received by the wireless communication unit 53, the relay determination unit 63 performs processing for determining whether or not the message is to be relayed, based on the information included in the message. The vehicle-vehicle communication relay unit 62 relays the message that the relay determination unit 63 has determined is to be relayed, and does not relay the message that the relay determination unit 63 has determined is not to be relayed. Hereinafter, an example of the relay determination unit 63 determining whether or not the message is to be relayed will be shown. However, the condition, method, and the like of determination performed by the relay determination unit 63 are not limited to those indicated hereinafter, and various conditions, methods, and the like may be used.

Determination Example 1

A traveling vehicle 1 and a stopped vehicle 1 may be present on roads. For example, it is conceivable that each vehicle 1 notifies the other vehicle 1 of its own position information in order to prevent the vehicles 1 from colliding at the intersection of the roads. In this kind of state, the traveling vehicle 1 has a higher likelihood of colliding with the other vehicle 1, and the stopped vehicle 1 has a lower likelihood of collision. In view of this, the relay determination unit 63 of the roadside communication apparatus 205 in determination example 1 determines whether or not the message is to be relayed according to whether the vehicle 1 that is the transmission source of the message is traveling or stopped.

For this reason, in the present example, the in-vehicle communication apparatus 10 of the vehicle 1 transmits information on the traveling speed (vehicle speed) of the vehicle 1, information on the state of the transmission of the vehicle 1, and the position information of the vehicle 1, included in the message. Note that the state information of the transmission can be information indicating which position the transmission of the vehicle 1 is to be switched to by the driver, such as "D (drive)", "N (neutral)", "R (reverse)", and "P (parking)", for example.

If a message from the vehicle 1 is received by the wireless communication unit 53, the relay determination unit 63 acquires the vehicle speed information and the state information of the transmission included in the message. If the vehicle speed is a predetermined speed (e.g., 4 km/h) or less, or the state of the transmission is "P" or "N", the relay determination unit 63 determines that the vehicle 1 of the transmission source of the message is in the stopped state and determines that relaying of the message is not to be performed.

By contrast, if the vehicle speed is a predetermined speed or more and the state of the transmission is "D" or "R", the relay determination unit 63 determines that the vehicle 1 that is the transmission source of the message is traveling, and determines that relaying of the message is to be performed.

Figure 13:
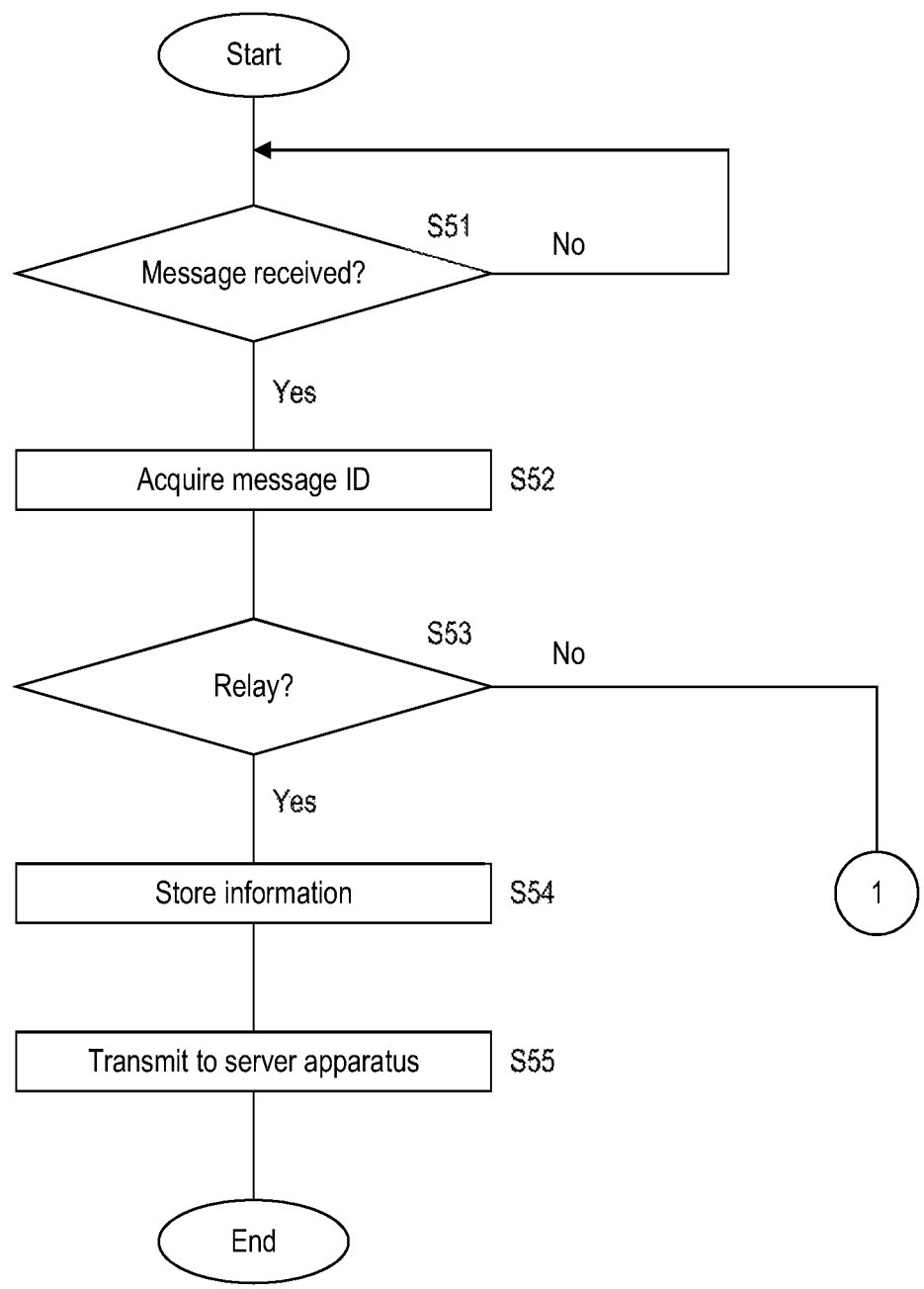
FIG. 13 is a block diagram showing a procedure of determination example 1 of relay determination processing performed by the roadside communication apparatus according to Embodiment 2.
Figure 14:
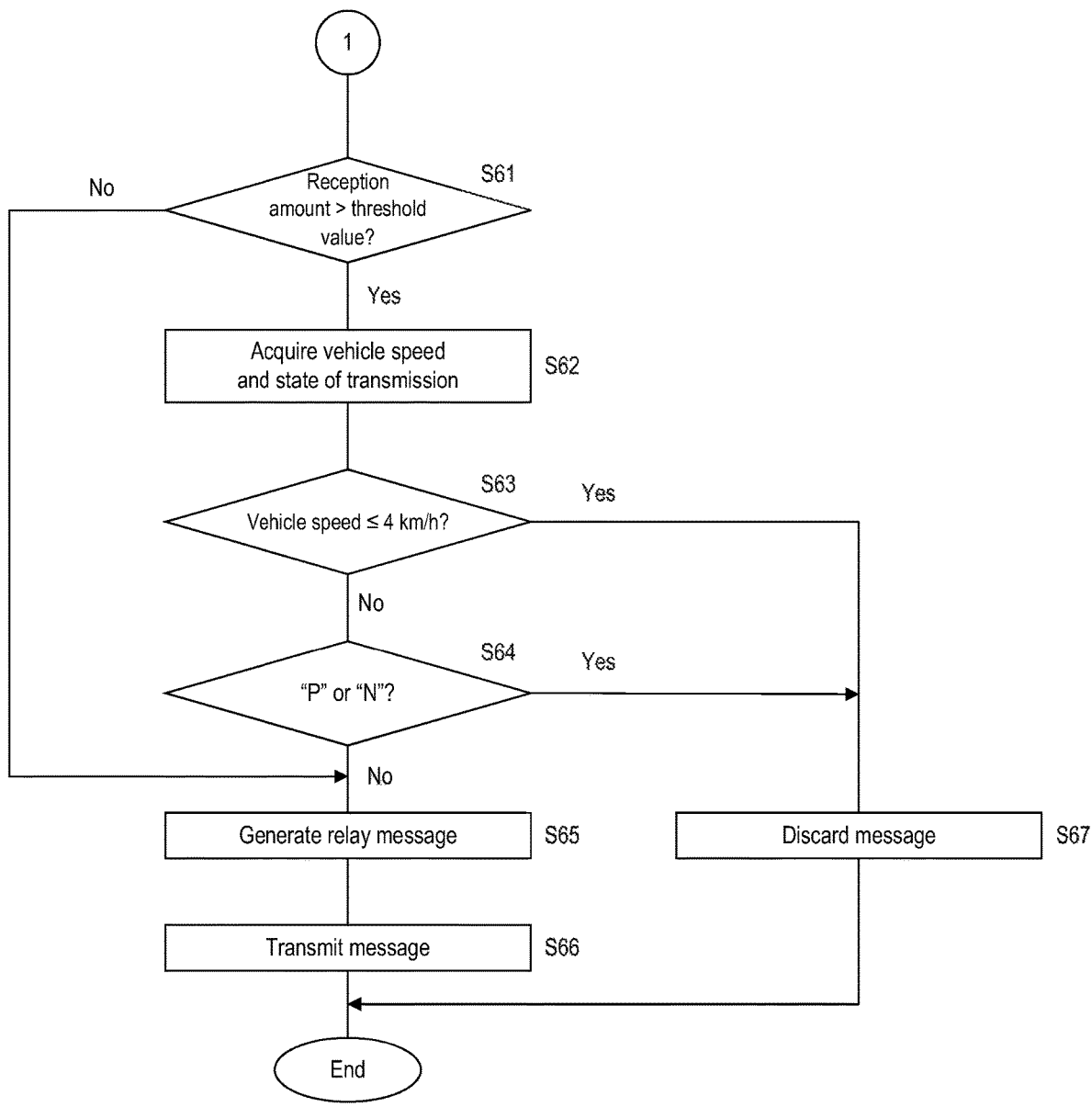
FIG. 14 is a block diagram showing a procedure of the determination example 1 of relay determination processing performed by the roadside communication apparatus according to Embodiment 2.

FIGS. 13 and 14 are flowcharts showing procedures of determination example 1 of relay determination processing performed by the roadside communication apparatus 205 according to Embodiment 2. The processing unit 51 of the roadside communication apparatus 205 according to Embodiment 2 determines whether or not a message from the vehicle 1 was received by the wireless communication unit 53 (step S51). If no message from the vehicle 1 has been received (S51: NO), the processing unit 51 waits until a message is received. If a message has been received (S51: YES), the processing unit 51 acquires the information of the message ID included in the received message (step S52).

Next, the processing unit 51 determines whether or not the information to which the message ID is added, which was acquired in step S52, is information that is to be relayed to the vehicles 1 in the surrounding area (step S53). If the received information to which the message ID is attached is not information that is to be relayed (S53: NO), the processing unit 51 stores the information included in the received message in the storage unit 52 (step S54). The processing unit 51 transmits the information stored in the storage unit 52 as appropriate to the traffic control server apparatus 72 and the like using the wired communication unit 54 (step S55), and ends the processing.

If the received information to which the message ID was added is information that is to be relayed (S53: YES), the relay determination unit 63 of the processing unit 51 determines whether or not the reception amount of the messages from the vehicle 1 in a predetermined period exceeds a threshold value (step S61). Note that although omitted in the illustration of the present flowchart, the processing unit 51 of the roadside communication apparatus 205 counts the reception amount of the number of message, number of bytes, or the like from the vehicle 1 received in one minute, for example, in order to perform the determination of step S61. If the message reception amount does not exceed the threshold value (S61: NO), the relay determination unit 63 determines that the received message is to be relayed. The vehicle-vehicle communication relay unit 62 of the processing unit 51 generates a message for relaying based on the information of the received message (step S65). The vehicle-vehicle communication relay unit 62 transmits the generated relay message to the vehicles 1 in the surrounding area using the wireless communication unit 53 (step S66) and ends the processing.

If the reception amount of the messages exceeds a threshold value (S61: YES), the relay determination unit 63 acquires the vehicle speed information and the state information of the transmission included in the received message (step S62). Based on the acquired vehicle speed information, the relay determination unit 63 determines whether or not the vehicle speed of the vehicle 1 that is the message transmission source is 4 km/h or less (step S63). If the vehicle speed of the vehicle 1 is 4 km/h or less (S63: YES), the relay determination unit 63 determines that the vehicle 1 is stopped, determines that the received message is not to be relayed, discards the received message (step S67), and ends the processing.

If the vehicle speed is not 4 km/h or less (S63: NO), that is, if the vehicle speed exceeds 4 km/h, the relay determination unit 63 determines whether or not the state of the transmission of the vehicle 1 that is the message transmission source is "P" or "N" based on the received state information of the transmission (step S64). If the state of the transmission is "P" or "N" (S64: YES), the relay determination unit 63 determines that the vehicle 1 is stopped, determines that the received message is not to be relayed, discards the received message (step S67), and ends the processing.

If the state of the transmission is not "P" or "N" (S64: NO), that is, if the state of the transmission is "D" or "R", the relay determination unit 63 determines that the vehicle 1 is traveling and determines that the received message is to be relayed. The vehicle-vehicle communication relay unit 62 of the processing unit 51 generates a message for relaying based on the information of the received message (step S65). The vehicle-vehicle communication relay unit 62 transmits the generated relay message to the vehicles 1 in the surrounding area using the wireless communication unit 53 (step S66) and ends the processing.

Note that in the present flowchart, the roadside communication apparatus 205 was configured to perform relay determination for the message based on the vehicle speed information and the state information of the transmission only in the case where the reception amount of the messages in a predetermined period exceeds a threshold value, but there is no limitation thereto. The roadside communication apparatus 205 may also be configured to always perform the relay determination for the message based on the vehicle speed information and the state information of the transmission without determining the reception amount of the messages in the predetermined time.

Determination Example 2

For example, if attention is given to the intersection of the roads, a vehicle 1 that travels in a direction of approaching the intersection and a vehicle 1 that travels in a direction of moving away from the intersection can be present. In the case of using a configuration in which the vehicle 1 performs exchange of vehicle information for the purpose of preventing the vehicles 1 from colliding at the intersection, the vehicle 1 approaching the intersection has a high likelihood of collision, and the vehicle 1 moving away from the intersection has a low likelihood of collision. In view of this, the relay determination unit 63 of the roadside communication apparatus 205 in determination example 2 determines whether or not the message is to be relayed according to whether the vehicle 1 that is the transmission source of the message is traveling in the direction of approaching a predetermined location (e.g., the center of an intersection) or is traveling in the direction of moving away from the predetermined location.

For this reason, in the present example, the in-vehicle communication apparatus 10 of the vehicle 1 transmits information relating to the traveling direction of the vehicle 1, and the position information of the vehicle, included in the message. However, it is also possible to use a configuration in which the roadside communication apparatus 205 calculates a change in the position based on multiple messages received from the vehicle 1 and calculates the advancing direction of the vehicle 1. A configuration is also possible in which the in-vehicle communication apparatus 10 includes the information on the traveling history of the vehicle 1 in a message and transmits the message, and the roadside communication apparatus 205 calculates the traveling direction of the vehicle 1 based on the traveling history.

Also, the roadside communication apparatus 205 is installed at or near an intersection of roads and stores information on the position (latitude and longitude) of the intersection in advance. The roadside communication apparatus 205 can determine whether the vehicle 1 is traveling in the direction of approaching the intersection or in the direction of moving away from the intersection based on the position and traveling direction of the vehicle 1 that is the message transmission source and the position of the intersection.

If a message from the vehicle 1 is received by the wireless communication unit 53, the relay determination unit 63 acquires the position information and the traveling direction information included in the message. The relay determination unit 63 determines whether the vehicle 1 that is the message transmission source is traveling in the direction of approaching the intersection or in the direction of moving away from the intersection based on the position information of the intersection stored in advance by the relay determination unit 63 and the position information and traveling direction information acquired from the message. If the vehicle 1 is traveling in the direction of approaching the intersection, the relay determination unit 63 determines that the message from the vehicle 1 is to be relayed. By contrast, if the vehicle 1 is traveling in the direction of moving away from the intersection, the relay determination unit 63 determines that the message from the vehicle 1 is not to be relayed.

Figure 15:
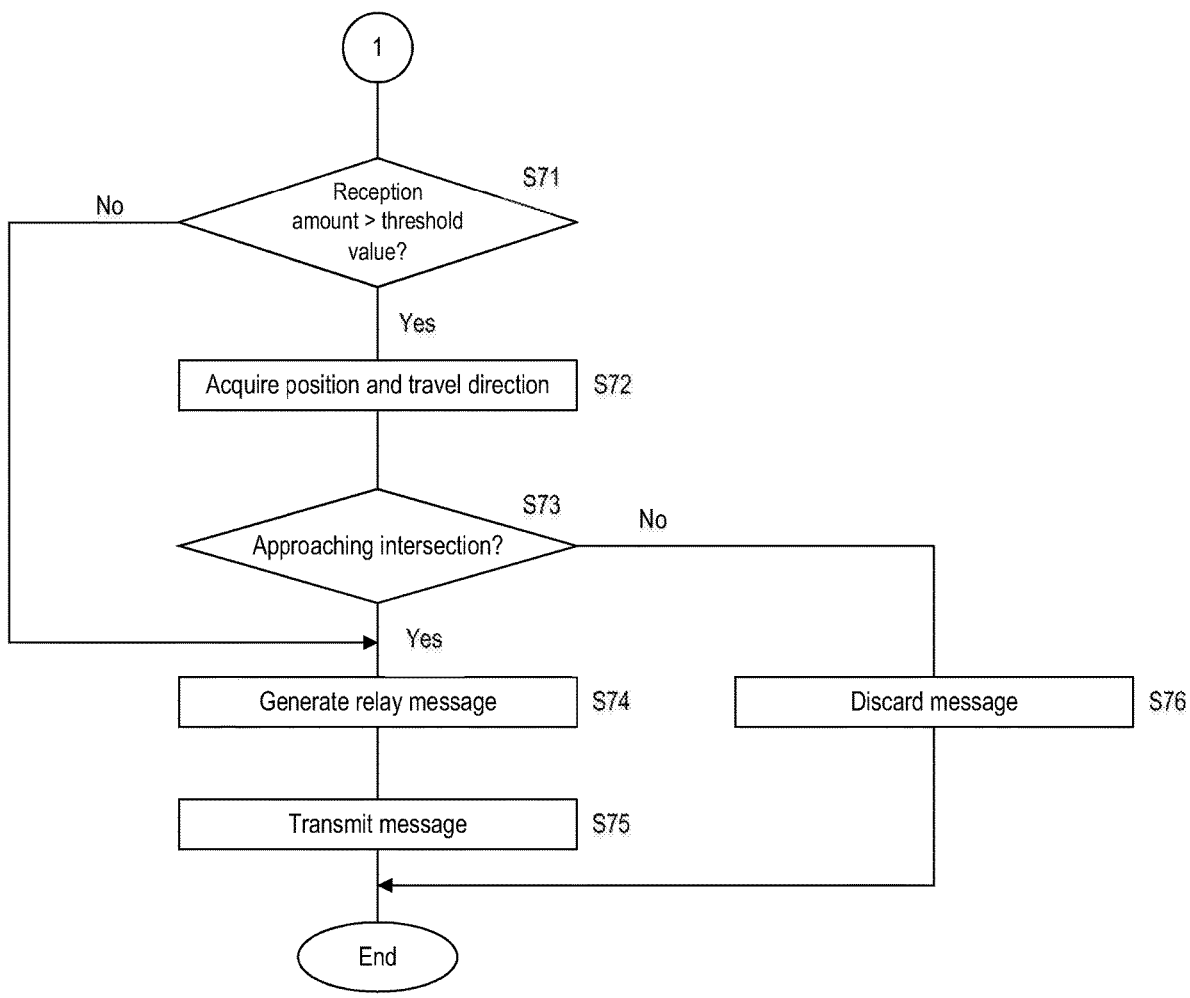
FIG. 15 is a block diagram showing a procedure of determination example 2 of relay determination processing performed by the roadside communication apparatus according to Embodiment 2.

FIG. 15 is a flowchart showing a procedure of determination example 2 of relay determination processing performed by the roadside communication apparatus 205 according to Embodiment 2. Note that in determination example 2, part of the relay determination processing performed by the roadside communication apparatus 205 is the same as the processing shown in FIGS. 13 and 14 in above-described determination example 1. That is, the relay determination processing of determination example 2 is the same as in steps S51 to S55 of the flowchart for determination example 1, and the processing thereafter is different. Accordingly, in FIG. 15, illustration of steps S51 to S55, which have the same processing content, is omitted, and only steps S71 to S76, which are the subsequent processing, are shown. In the following description as well, description of the processing of steps S51 to S55 is omitted, and the processing of steps S71 to S76 will be described.

If the information included in the message received from the vehicle 1 is information that is to be relayed (S53: YES), the relay determination unit 63 of the processing unit 51 determines whether or not the reception amount of the messages from the vehicle 1 in a predetermined period exceeds a threshold value (step S71). If the message reception amount does not exceed the threshold value (S71: NO), the relay determination unit 63 determines that the received message is to be relayed. The vehicle-vehicle communication relay unit 62 of the processing unit 51 generates a message for relaying based on the information of the received message (step S74). The vehicle-vehicle communication relay unit 62 transmits the generated relay message to the vehicles 1 in the surrounding area using the wireless communication unit 53 (step S75) and ends the processing.

If the reception amount of the messages exceeds a threshold value (S71: YES), the relay determination unit 63 acquires the position information and the traveling direction information of the vehicle 1, which are included in the received message (step S72). Based on the acquired position information and traveling direction information, the relay determination unit 63 determines whether or not the vehicle 1 that is the message transmission source is approaching the predetermined intersection (that is, whether or not the vehicle 1 is traveling in the direction of approaching) (step S73).

If the vehicle 1 that is the message transmission source is not approaching the predetermined intersection (S73: NO), that is, if the vehicle 1 is traveling in the direction of moving away from the intersection, the relay determination unit 63 determines that the received message is not to be relayed, discards the received message (step S76), and ends the processing.

If the vehicle 1 that is the message transmission source is approaching the predetermined intersection (S73: YES), the relay determination unit 63 determines that the received message is to be relayed. The vehicle-vehicle communication relay unit 62 of the processing unit 51 generates a message for relaying based on the information of the received message (step S74). The vehicle-vehicle communication relay unit 62 transmits the generated relay message to the vehicles 1 in the surrounding area using the wireless communication unit 53 (step S75) and ends the processing.

Note that in the present flowchart, the roadside communication apparatus 205 was configured to perform relay determination for the message based on the position information and the traveling direction information only in the case where the reception amount of the messages in a predetermined period exceeds a threshold value, but there is no limitation thereto. The roadside communication apparatus 205 may also be configured to always perform the relay determination for the message based on the position information and the traveling direction information without determining the reception amount of the messages in the predetermined period.

Note that in the present example, the "predetermined location" that is the determination reference in the case of performing determination based on the traveling direction was the center of the intersection of the roads, but the predetermined location is not limited thereto. The predetermined location may be the installation position of the roadside communication apparatus 205, and may be another point on the road.

Determination Example 3

For example, if attention is given to the intersection of the roads, there are various distances between the intersection and the vehicles 1 from which the roadside communication apparatus 205 can receive messages. In the case of using a configuration in which the vehicle 1 performs exchange of vehicle information for the purpose of preventing the vehicles 1 from colliding at the intersection, the vehicle 1 that is at a location near the intersection has a high likelihood of collision, and the vehicle 1 that is at a position far from the intersection has a low likelihood of collision. In view of this, the relay determination unit 63 of the roadside communication apparatus 205 in determination example 3 calculates the distance from the predetermined location (e.g., the center of the intersection) to the vehicle 1 that is the message transmission source, and determines whether or not the message is to be relayed according to whether or not the vehicle 1 is within a predetermined distance range from the predetermined location.

For this reason, in the present example, the in-vehicle communication apparatus 10 of the vehicle 1 need only transmit at least the position information of the vehicle 1. The roadside communication apparatus 205 is installed at or near an intersection of roads, for example, and stores information on the position (latitude and longitude) of the intersection in advance. The roadside communication apparatus 205 determines whether or not the vehicle 1 is within the predetermined range from the intersection based on the position of the vehicle 1 that is the message transmission source and the position of the intersection.

If a message from the vehicle 1 is received by the wireless communication unit 53, the relay determination unit 63 acquires the position information included in the message. The relay determination unit 63 calculates the distance from the intersection to the vehicle 1 that is the message transmission source based on the position information of the intersection stored by the relay determination unit 63 in advance, and the position information acquired from the message. Also, the relay determination unit 63 can calculate the number of vehicles 1 within the predetermined range from the intersection by calculating the distances from the intersection to the vehicles 1 based on the messages received from the multiple vehicles 1.

In view of this, if there are more than, for example, 100 vehicles 1 that are within a range of, for example, 500 m from the intersection, the relay determination unit 63 limits the vehicles 1 for which the messages are to be relayed to the vehicles that are within a range of, for example, 300 m. If the vehicle 1 that is the transmission source of the message is within a range of 300 m from the intersection, the relay determination unit 63 determines that the message from the vehicle 1 is to be relayed. By contrast, if a vehicle 1 is outside of the range of 300 m from the intersection, the relay determination unit 63 determines that the message from the vehicle 1 is not to be relayed.

Furthermore, if there are more than, for example, 100 vehicles 1 that are within the range of 300 m from the intersection, the relay determination unit 63 may also limit the vehicles 1 for which the messages are to be relayed to within a range of, for example, 15 m from the intersection. In this manner, if the number of vehicles 1 within the predetermined range exceeds a threshold value, the relay determination unit 63 may also gradually contract the range in which the messages are relayed. If the number of vehicles 1 within the predetermined range no longer exceeds the threshold value, the relay determination unit 63 may also gradually expand the range in which the messages are relayed.

For example, the relay determination unit 63 may also perform ordering of the vehicles 1 with the shortest distances to the intersection, determine that relaying of the messages is to be performed for the 1st to 50th vehicles 1, and determine that relaying of the messages is not to be performed for the other vehicles 1.

Figure 16:
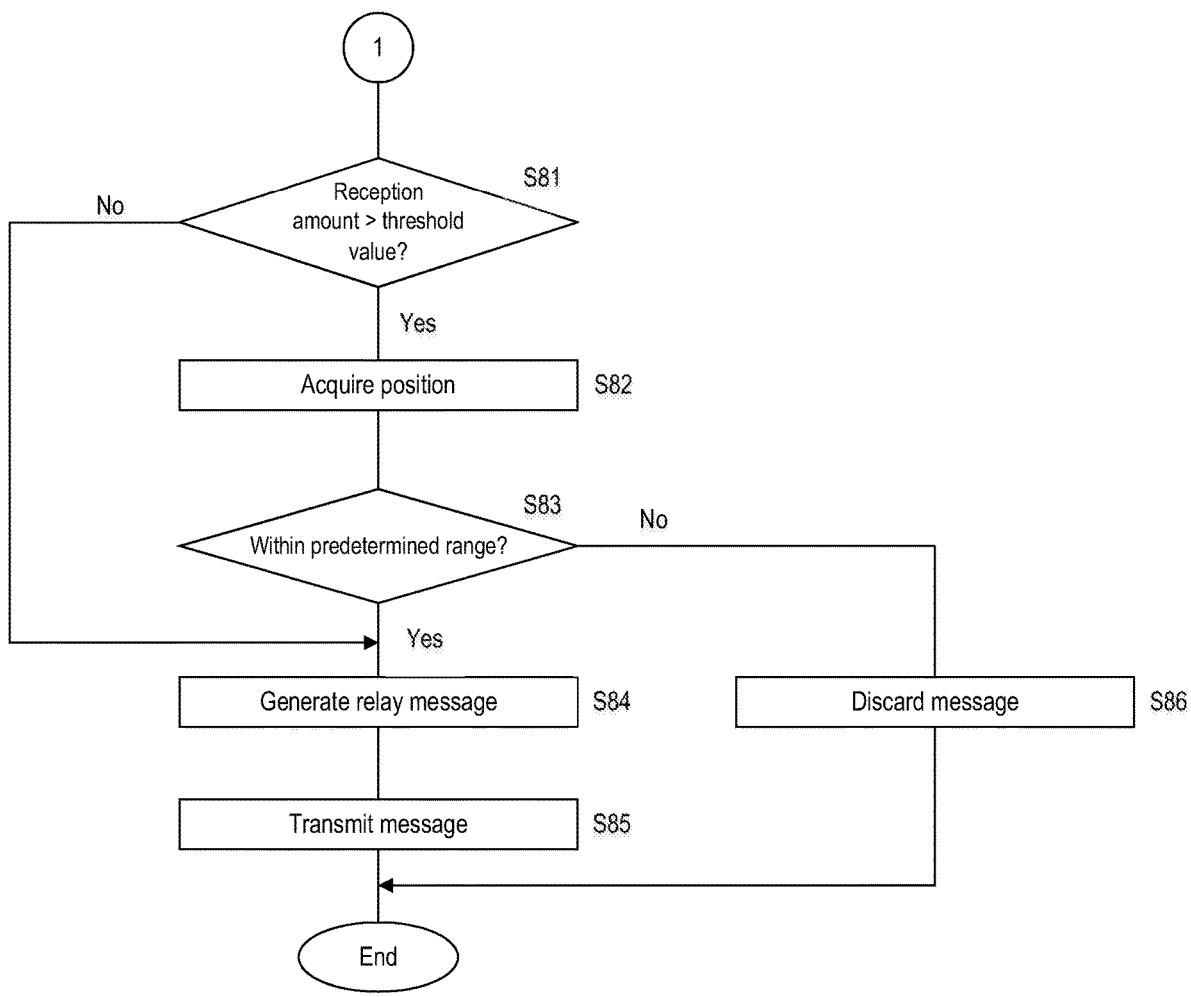
FIG. 16 is a block diagram showing a procedure of determination example 3 of relay determination processing performed by the roadside communication apparatus according to Embodiment 2.

FIG. 16 is a flowchart showing a procedure of determination example 3 of relay determination processing performed by the roadside communication apparatus 205 according to Embodiment 2. Note that in determination example 3, part of the relay determination processing performed by the roadside communication apparatus 205 is the same as the processing shown in FIGS. 13 and 14 in above-described determination example 1. That is, the relay determination processing of determination example 3 is the same as in steps S51 to S55 of the flowchart for determination example 1, and the processing thereafter is different. Accordingly, in FIG. 16, illustration of steps S51 to S55, which have the same processing content, is omitted, and only steps S81 to S86, which are the subsequent processing, are shown. In the following description as well, description of the processing of steps S51 to S55 is omitted, and the processing of steps S81 to S86 will be described.

If the information included in the message received from the vehicle 1 is information that is to be relayed (S53: YES), the relay determination unit 63 of the processing unit 51 determines whether or not the number of the vehicles 1 within a predetermined range from a predetermined position such as the intersection of the roads exceeds a threshold value (step S81). If the number of the vehicles 1 does not exceed the threshold value (S81: NO), the relay determination unit 63 determines that the received message is to be relayed. The vehicle-vehicle communication relay unit 62 of the processing unit 51 generates a message for relaying based on the information of the received message (step S84). The vehicle-vehicle communication relay unit 62 transmits the generated relay message to the vehicles 1 in the surrounding area using the wireless communication unit 53 (step S85) and ends the processing.

If the number of vehicles 1 within the predetermined range exceeds the threshold value (S81: YES), the relay determination unit 63 acquires the position information of the vehicle 1 included in the received message (step S82). Based on the acquired position information, the relay determination unit 63 determines whether or not the vehicle 1 that is the message transmission source is within a predetermined range from a predetermined position such as the intersection of the roads (step S83). Note that in step S81, the predetermined range for determining the number of vehicles 1 and the predetermined range for determining in step S83 may be the same range, or may be different ranges.

If the vehicle 1 that is the message transmission source is not within the predetermined range from the predetermined position (S83: NO), the relay determination unit 63 determines that the received message is not to be relayed, discards the received message (step S86), and ends the processing.

If the vehicle 1 that is the message transmission source is within the predetermined range from the predetermined position (S83: YES), the relay determination unit 63 determines that the received message is to be relayed. The vehicle-vehicle communication relay unit 62 of the processing unit 51 generates a message for relaying based on the information of the received message (step S84). The vehicle-vehicle communication relay unit 62 transmits the generated relay message to the vehicles 1 in the surrounding area using the wireless communication unit 53 (step S85) and ends the processing.

Note that in the present example, the center of the intersection of the roads was set as the "predetermined position" that is to serve as a determination reference in the case of performing determination based on the position of the vehicle 1, but the predetermined position is not limited thereto. The predetermined location may be the installation position of the roadside communication apparatus 205, and may be another point on the road.

Determination Example 4

For example, if the roadside communication apparatus 205 is installed at each intersection of roads, there is a possibility that another roadside communication apparatus 205 will be within the wireless communication range of a certain roadside communication apparatus 205. In such a case, there is a possibility that the message of the vehicle 1 relayed by a certain roadside communication apparatus 205 will be received by another roadside communication apparatus 205 in the vicinity and the message of the vehicle 1 received by the other roadside communication apparatus 205 will be further relayed. If relaying of this kind of message is repeatedly performed by the multiple roadside communication apparatus 205, the message is received by another vehicle 1 at a location that is far away from the vehicle 1 that is the transmission source. There is also a possibility that the message of the vehicle 1 that was relayed by a certain roadside communication apparatus will be further relayed by another roadside communication apparatus 205 in the vicinity, and the message will be re-received by the roadside communication apparatus 205 that is the relay source.

In view of this, the relay determination unit 63 of the roadside communication apparatus 205 in determination example 4 excludes the message of the vehicle 1 that was already relayed by the other roadside communication apparatus 205 from the relay targets. In Embodiment 1, for example, as shown in FIG. 7, the roadside communication apparatus 205 performs relaying by transmitting a relay message obtained by adding the roadside ID of the roadside communication apparatus 205 to the message received from the vehicle 1. For this reason, if the roadside ID and the vehicle ID are added to the message received by the roadside communication apparatus 205, it is possible to determine that the message is the message from the vehicle 1 that has already been relayed by the other roadside communication apparatus 205. Accordingly, if the roadside ID and the vehicle ID have been added to the received message, the roadside communication apparatus 205 determines that the message is not to be relayed.

Note that the message received by the roadside communication apparatus 205 from the other roadside communication apparatus 205 can include a message generated by the other roadside communication apparatus 205, in addition to a message that was transmitted by the vehicle 1 and relayed by the other roadside communication apparatus 205. For example, the roadside communication apparatus 205 may generate and transmit a message such as information on a traffic light installed on the road and traffic information of the road, for example. Although this kind of message generated by the roadside communication apparatus 205 includes the roadside ID, it does not include the vehicle ID. If this kind of message generated by the other roadside communication apparatus 205 has been received, the roadside communication apparatus 205 may or may not relay the message, and for example, the roadside communication apparatus 205 may also determine whether or not relaying is possible based on the message ID included in the message.

Figure 17:
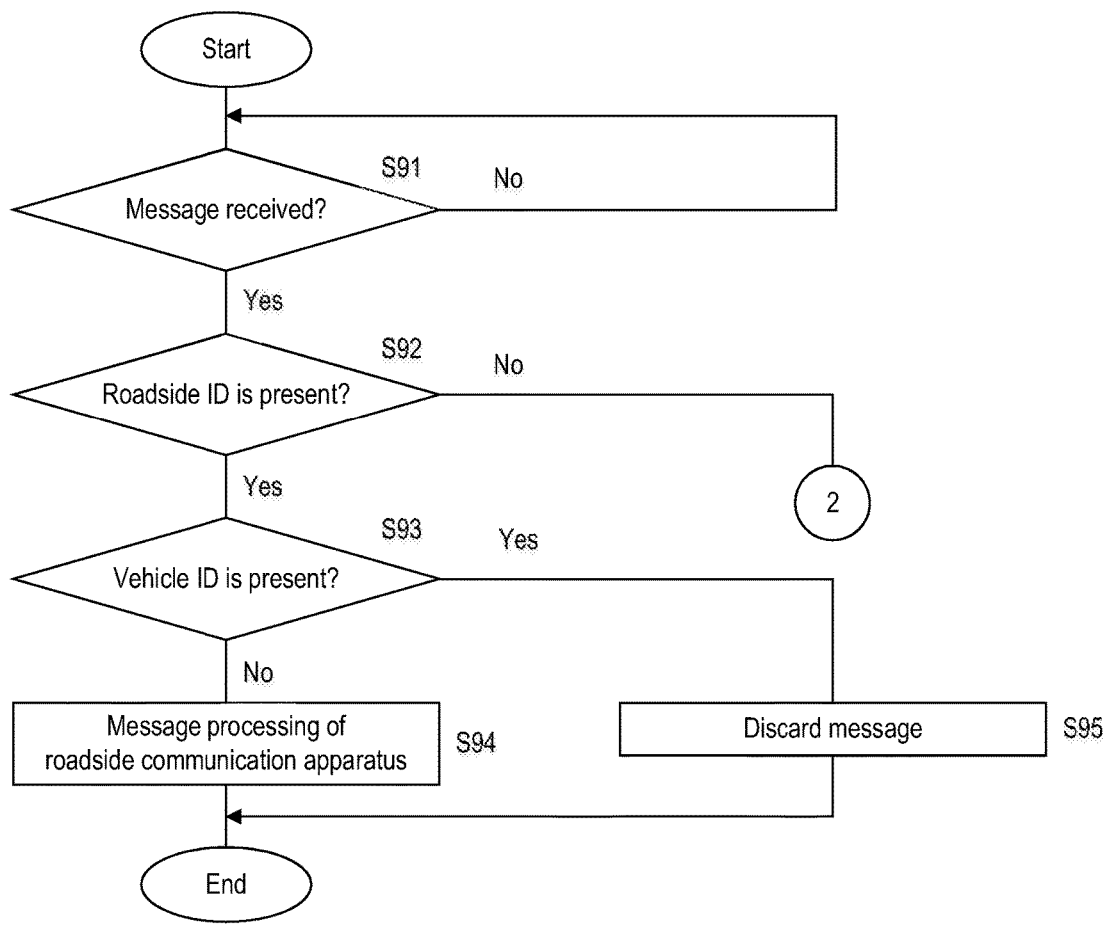
FIG. 17 is a block diagram showing a procedure of determination example 4 of relay determination processing performed by the roadside communication apparatus according to Embodiment 2.
Figure 18:
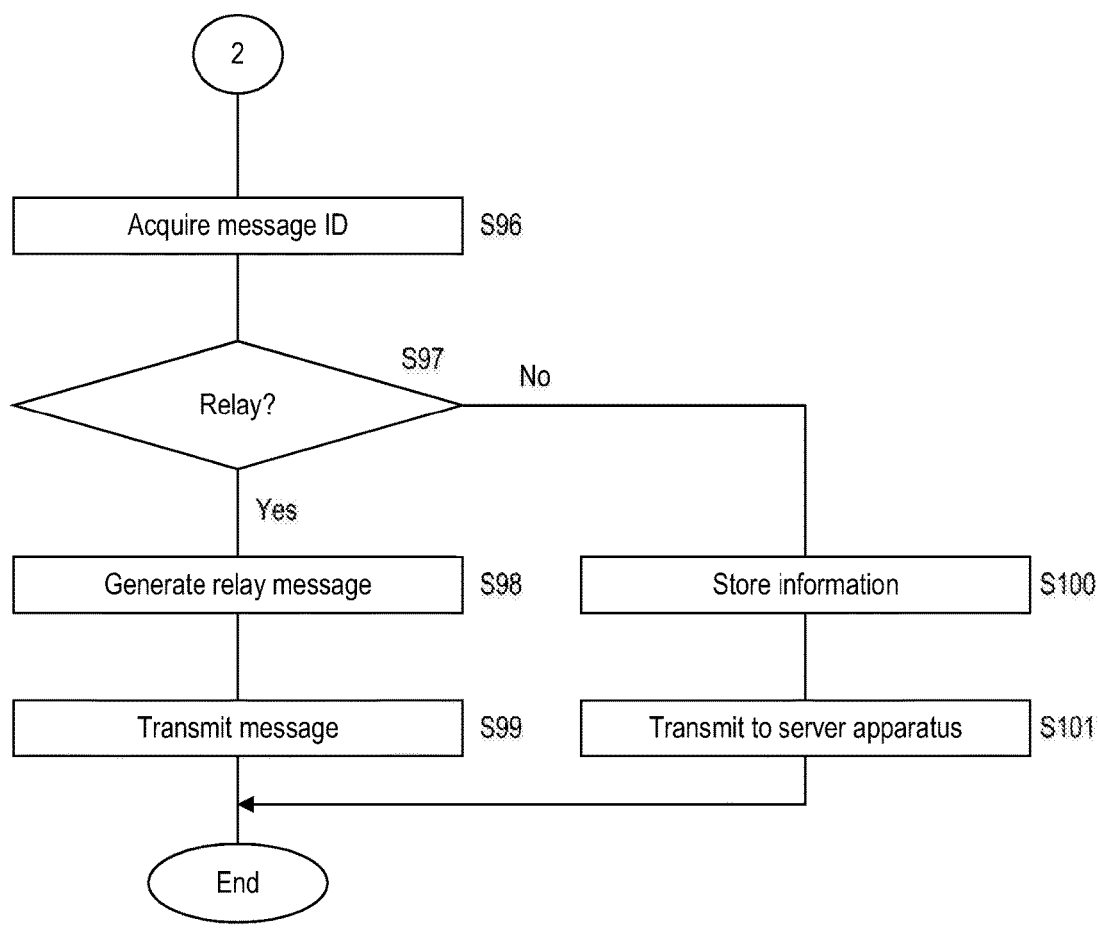
FIG. 18 is a block diagram showing a procedure of determination example 4 of relay determination processing performed by the roadside communication apparatus according to Embodiment 2.

FIGS. 17 and 18 are flowcharts showing procedures of determination example 4 of relay determination processing performed by the roadside communication apparatus 205 according to Embodiment 2. The processing unit 51 of the roadside communication apparatus 205 according to Embodiment 2 determines whether or not a message was received by the wireless communication unit 53 (step S91). If no message has been received (S91: NO), the processing unit 51 waits until the message is received. If the message has been received (S91: YES), the relay determination unit 63 of the processing unit 51 determines whether or not the roadside ID has been added to the received message (step S92).

If the roadside ID has been added to the received message (S92: YES), the relay determination unit 63 determines whether or not the vehicle ID has been added to the message (step S93). If the vehicle ID has been added (S93: YES), the relay determination unit 63 determines that the message is a message from the vehicle 1, which was relayed by the other roadside communication apparatus 205, and determines that the message is not to be relayed. The processing unit 51 discards the message (step S94) and ends the processing.

If no vehicle ID has been added to the received message (S93: NO), the relay determination unit 63 determines that the message is a message that was generated by the other roadside communication apparatus 205. Based on the message ID or the like included in the message, for example, the processing unit 51 performs processing on the message generated by the roadside communication apparatus 205 as appropriate (step S95) and ends the processing.

If the roadside ID has not been added to the received message (S92: NO), the relay determination unit 63 determines that the message is a message transmitted from the vehicle 1 and acquires the information on the message ID included in the message (step S96). The relay determination unit 63 determines whether or not the information to which the acquired message ID was added is information that is to be relayed to the vehicles 1 in the surrounding area (step S97).

If the acquired information to which the message ID is attached is information that is to be relayed (S53: YES), the vehicle-vehicle communication relay unit 62 of the processing unit 51 generates a message for relaying based on the information on the received message (step S98). The vehicle-vehicle communication relay unit 62 transmits the generated relay message to the vehicles 1 in the surrounding area using the wireless communication unit 53 (step S99) and ends the processing.

If the received information to which the message ID is attached is not information that is to be relayed (S97: NO), the processing unit 51 stores the information included in the received message in the storage unit 52 (step S100). The processing unit 51 transmits the information stored in the storage unit 52 as appropriate to the traffic control server apparatus 72 and the like using the wired communication unit 54 (step S101), and ends the processing.

By using a configuration in which the roadside communication apparatus 205 according to Embodiment 2 with the above-described configuration determines whether or not the message is to be relayed to the other vehicle based on the information included in the message received from the in-vehicle communication apparatus 10 of the vehicle 1, it is possible to suppress an increase in the communication amount of wireless communication performed between the roadside communication apparatus 205 and the in-vehicle communication apparatus 10.

Note that in the present example, the roadside communication apparatus 205 was configured to determine whether or not the other roadside communication apparatus 205 has already relayed the message based on whether or the roadside ID has been added to the received message, but there is no limitation to this. For example, the roadside communication apparatus 205 may also be configured to add information on the number of instances of relaying to the message and transmit the message when the message is to be relayed. The roadside communication apparatus 205 can be configured to determine whether or not the message is to be further relayed by checking the number of instances of relaying added to the message when the message is received.

Also, although four methods, namely determination examples 1 to 4, were described as methods for determining whether or not the relay determination unit 63 is to relay the message in Embodiment 2, the relay determination unit 63 may also perform determination using one of the methods, and may perform determination using a combination of multiple methods.

Other configurations of the vehicle-vehicle communication system according to Embodiment 2 are similar to those of the vehicle-vehicle communication system according to Embodiment 1, and therefore similar locations are denoted by the same reference signs thereas, and detailed description is omitted.

Embodiment 3

Figure 19:
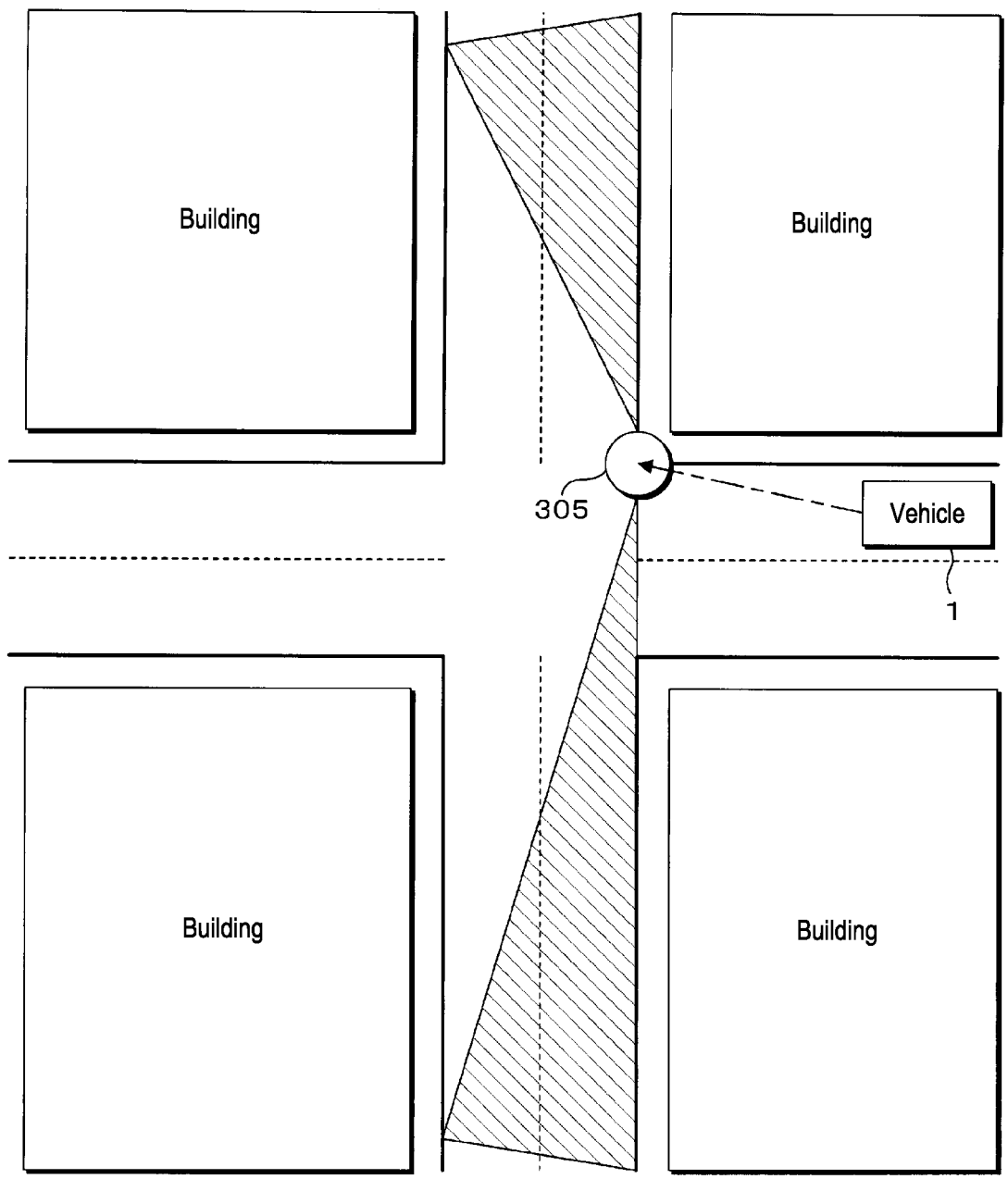
FIG. 19 is a schematic diagram for illustrating an overview of a vehicle-vehicle communication system according to Embodiment 3.
Figure 20:
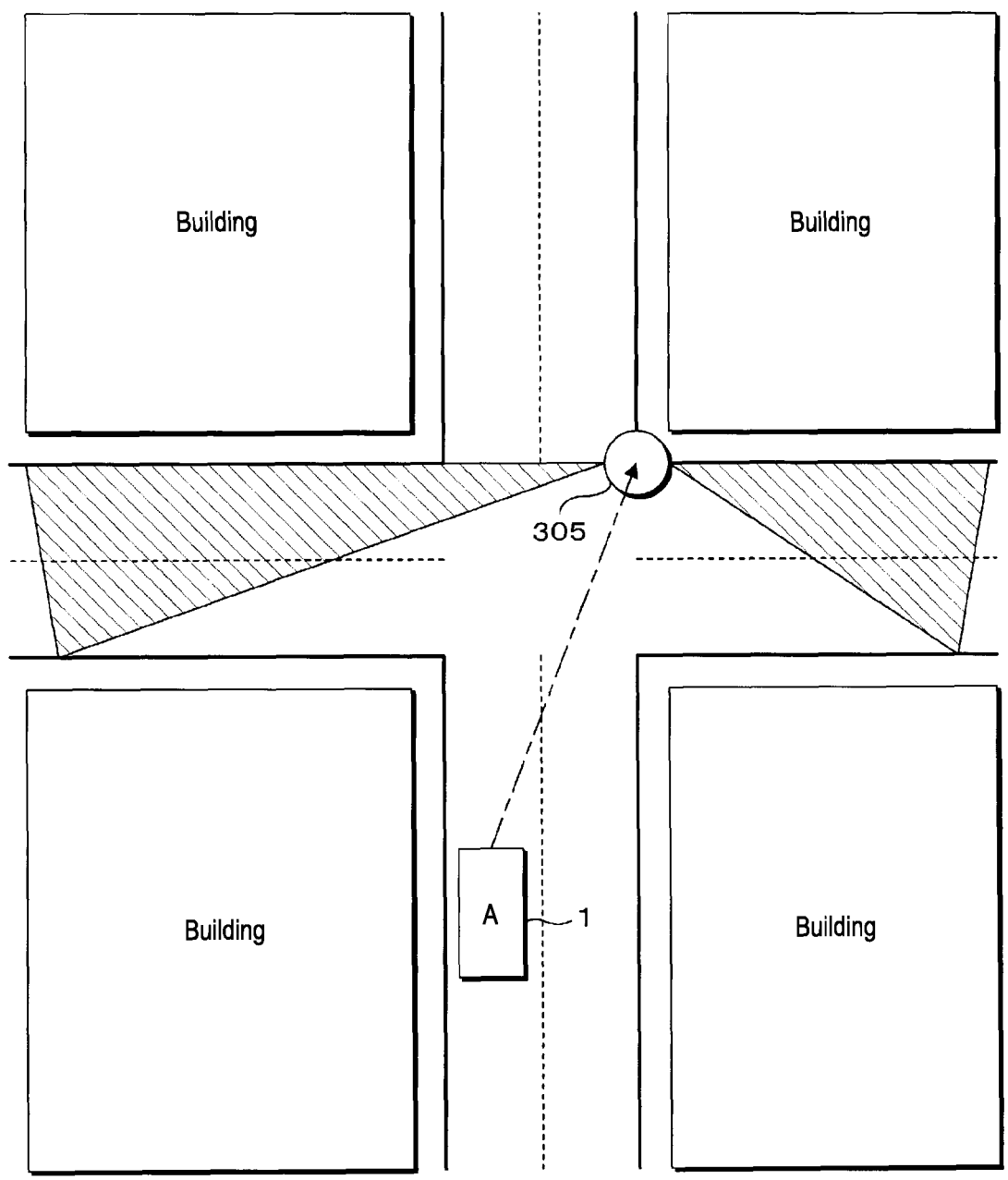
FIG. 20 is a schematic diagram for illustrating an overview of the vehicle-vehicle communication system according to Embodiment 3.

FIGS. 19 and 20 are schematic diagrams for describing an overview of a vehicle-vehicle communication system according to Embodiment 3. For example, by using a technique such as beam forming, a roadside communication apparatus 305 of the vehicle-vehicle communication system according to Embodiment 3 can control the transmission direction of the wireless signal.

In the example shown in FIGS. 19 and 20, the roadside communication apparatus 305 is installed at the upper right corner portion of an intersection at which a road extending in the up-down direction of the diagram and a road extending in the left-right direction are approximately perpendicular to each other. The roadside communication apparatus 305 according to Embodiment 3 can limit the transmission direction of the wireless signal to two patterns, namely a direction along the road that extends in the up-down direction as shown in FIG. 19, and a direction along the road that extends in the left-right direction as shown in FIG. 20.

The in-vehicle communication apparatus 10 of the vehicle 1 transmits a message including information such as the position and the traveling direction of the vehicle 1 to another vehicle 1 and the roadside communication apparatus 305. Based on the information included in the received message, the roadside communication apparatus 305 that has received the message from the vehicle 1 determines which of the road that extends in the up-down direction in the diagram or the road that extends in the left-right direction in the diagram the vehicle 1 that is the message transmission source is on.

For example, as shown in FIG. 19, if the vehicle 1 that is the message transmission source is on the road that extends in the left-right direction, the roadside communication apparatus 305 transmits a wireless signal for relaying the received message in the direction along the road that intersects the road on which the vehicle 1 is located, that is, the road that extends in the up-down direction. Note that in FIGS. 19 and 20, the range in which the wireless signals transmitted by the roadside communication apparatus 305 can be received is shown as a region denoted by hatching.

For example, as shown in FIG. 20, if the vehicle 1 that is the message transmission source is on the road that extends in the up-down direction, the roadside communication apparatus 305 transmits a wireless signal for relaying the received message in the direction along the road that intersects the road on which the vehicle 1 is located, that is, the road that extends in the left-right direction.

Note that in FIGS. 19 and 20, a case in which the road that extends in the up-down direction and the road that extends in the left-right direction are approximately perpendicular to each other, that is, a so-called crossroad, was described as an example, but the application of the roadside communication apparatus 305 according to Embodiment 3 is not limited to a crossroad. For example the roadside communication apparatus 305 can be applied to various road configurations, such as a three-way junction, a T junction, a Y junction, a five-way junction, a six-way junction, a seven-way junction, or a multiple-way junction, and in such a case, the roadside communication apparatus 305 need only transmit the wireless signal for relaying the message in directions along one or more roads that intersect the road on which the vehicle 1 that is the message transmission source 1 is located.

Figure 21:
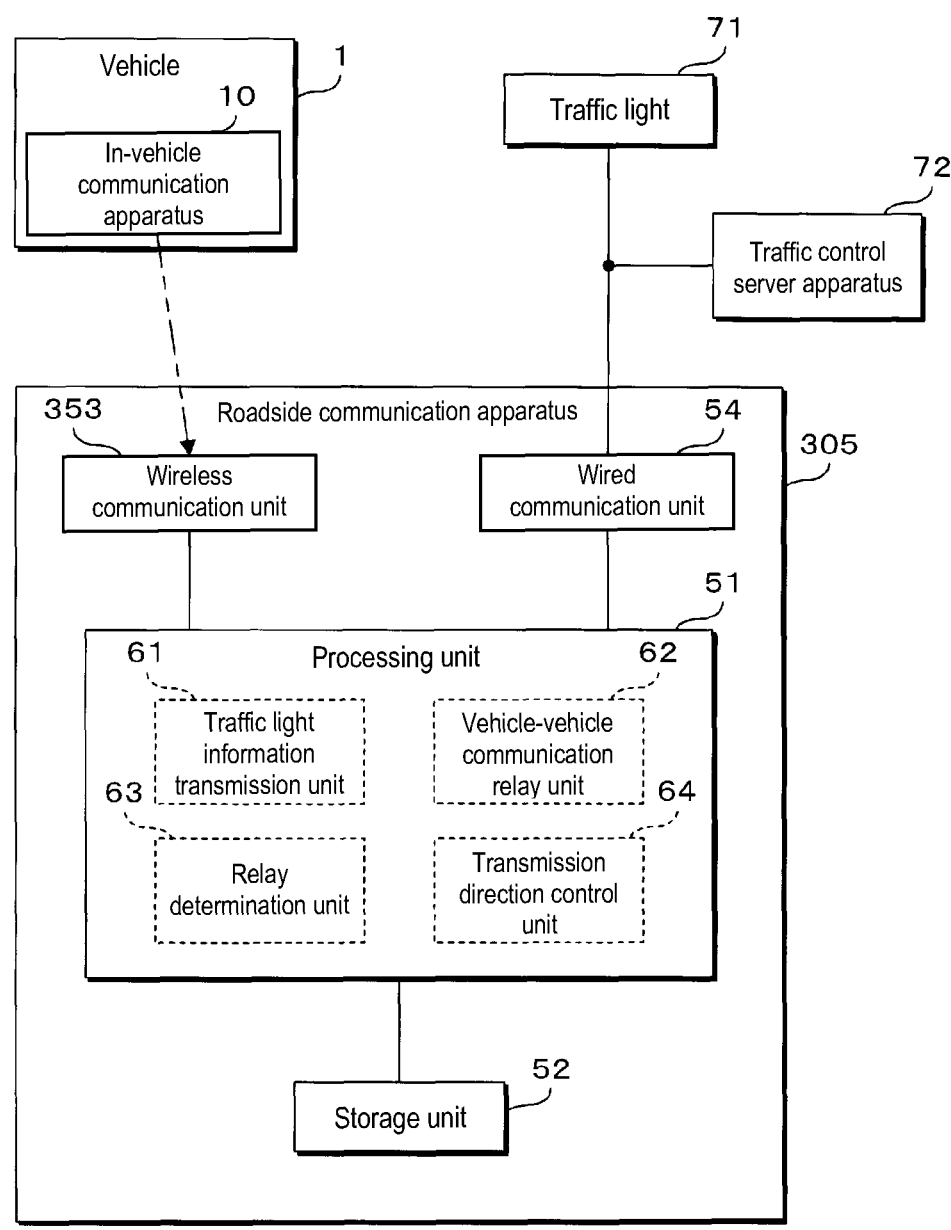
FIG. 21 is a block diagram showing a configuration of a roadside communication apparatus according to Embodiment 3.

FIG. 21 is a block diagram showing a configuration of a roadside communication apparatus 305 according to Embodiment 3. The roadside communication apparatus 305 according to Embodiment 3 includes a wireless communication unit 353 that can control (change or restrict) the transmission direction of the wireless signal by using a technique such as beam forming, for example. The wireless communication unit 353 dynamically switches the transmission direction of the wireless signals by using an active phased array antenna that can dynamically control the directionality by controlling the phase of the signal applied to the multiple antennas, for example. The wireless communication unit 353 switches the transmission direction of the wireless signal according to a command provided from the processing unit 51.

Note that in the case of a crossroad road structure shown in FIGS. 19 and 20, for example, the switching of the transmission direction of the wireless signal performed by the wireless communication unit 353 need only be performed in at least two stages, namely the up-down direction and the left-right direction, and the switching does not need to be performed in three stages or more or in no stages. In such a case, the wireless communication unit 353 may be configured to include two antennas, namely an antenna for the up-down direction and an antenna for the left-right direction, and switch the transmission direction by selecting and using one of the antennas.

With the roadside communication apparatus 305 according to Embodiment 3, a transmission direction control unit 64 has been added to the processing unit 51 in the roadside communication apparatus 205 according to Embodiment 2. If a message from the vehicle 1 was received by the wireless communication unit 353, the transmission direction control unit 64 acquires the position information and the like included in the received message and determines which road the vehicle 1 that is the message transmission source is located on. For this reason, the roadside communication apparatus 305 stores information such as the positions, orientations, and shapes of the roads in the surrounding area in advance. The transmission direction control unit 64 can determine which road the vehicle 1 that is the message transmission source is located on by comparing the position information included in the received message to these stored pieces of information.

Upon determining the road on which the vehicle 1 that is the message transmission source is located, the transmission direction control unit 64 instructs the wireless communication unit 353 to switch the transmission direction such that the direction along the road intersecting the road on which the vehicle 1 is located is set as the transmission direction of the wireless signal of the message to be relayed. The wireless communication unit 353 switches the transmission direction of the wireless signal in response to the instruction from the transmission direction control unit 64 and transmits the relay message provided from the processing unit 51 as the wireless signal.

Figure 22:
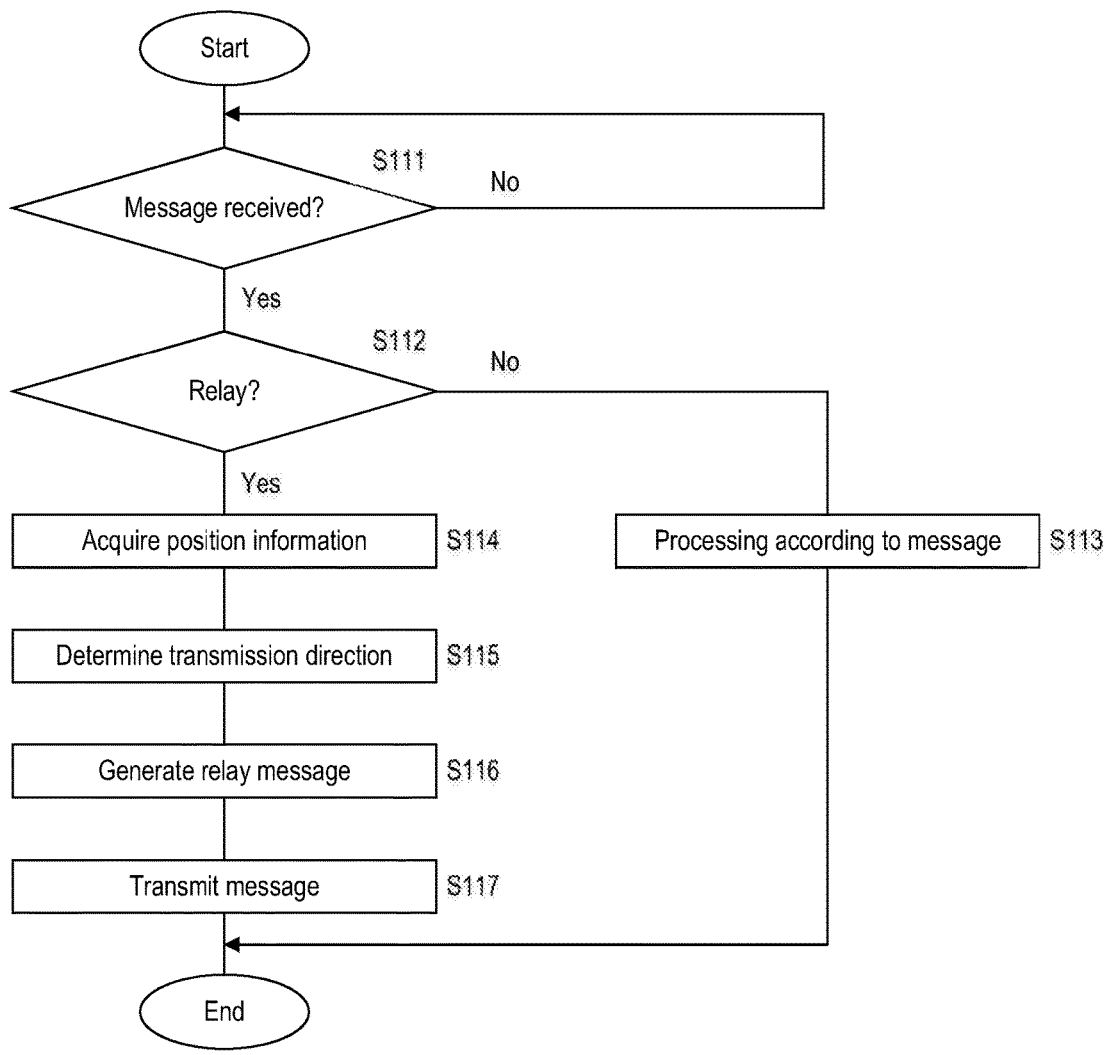
FIG. 22 is a flowchart showing a procedure of information exchange processing performed by the roadside communication apparatus according to Embodiment 3.

FIG. 22 is a flowchart showing a procedure of information reception processing performed by the roadside communication apparatus 305 according to Embodiment 3. The processing unit 51 of the roadside communication apparatus 305 according to Embodiment 3 determines whether or not a message from the vehicle 1 was received by the wireless communication unit 353 (step S111). If no message from the vehicle 1 has been received (S111: NO), the processing unit 51 waits until a message is received.

If the message has been received (S111: YES), the relay determination unit 63 of the processing unit 51 determines whether or not the received message is to be relayed (step S112). Note that any of the methods described in Embodiment 2 may be used as the determination method performed by the relay determination unit 63. If the relay determination unit 63 determines that the message is not to be relayed (S112: NO), the processing unit 51 performs appropriate processing according to the information included in the received message (step S113) and ends the processing.

If the relay determination unit 63 has determined that the message is to be relayed (S112: YES), the transmission direction control unit 64 of the processing unit 51 acquires the position information included in the received message (step S114). The transmission direction control unit 64 determines the road on which the vehicle 1 that is the message transmission source is located based on the acquired position information and determines the direction along the road intersecting that road as the transmission direction of the message to be relayed (step S115).

The vehicle-vehicle communication relay unit 62 of the processing unit 51 generates a message for relaying based on the information included in the message received from the vehicle 1 (step S116). The transmission direction determined in step S115 is instructed to the wireless communication unit 353 and the relay message generated by the vehicle-vehicle communication relay unit 62 is provided to the wireless communication unit 353, whereby the message for relaying is transmitted by the wireless communication unit 353 to the vehicles 1 in the surrounding area (step S117), and the processing ends.

The roadside communication apparatus 305 according to Embodiment 3 with the above-described configuration includes the wireless communication unit 353, which has a function of switching the transmission direction of the wireless signal. By using a technique such as beam forming, for example, the wireless communication unit 353 can narrow the wireless signal and emit it in a specific direction in a concentrated manner, and accordingly, the roadside communication apparatus 305 can control the transmission direction of the wireless signal. The roadside communication apparatus 305 according to Embodiment 3 controls the transmission direction such that the wireless signal for relaying the received message is transmitted in the direction along the other road intersecting the road along which the vehicle 1 that is the transmission source of the received message travels.

For example, there is a high likelihood that the wireless signals transmitted by the vehicle 1 will reach in the direction along the road along which the vehicle 1 that is the transmission source travels, but there is a possibility that the signals will not reach due to the influence of an obstacle such as a building in the direction along the other intersecting road. The roadside communication apparatus 305 according to Embodiment 3 can reduce the reception of unneeded information by the in-vehicle communication apparatus 10 of the vehicle by controlling the direction of the wireless signal of the message to be relayed.

Note that in Embodiment 3, the direction along the road is used as the direction in which the message to be relayed by the roadside communication apparatus 305 is transmitted, but there is no limitation thereto. The transmission direction of the wireless signal transmitted by the roadside communication apparatus 305 need not be along the road, and may also be a direction in which a road is present. The transmission direction of the wireless signal transmitted by the roadside communication apparatus 305 need only be a direction in which the wireless signal reaches the other vehicle 1 which is on the road intersecting the road on which the vehicle 1 that is the message transmission source is located.

Other configurations of the vehicle-vehicle communication system according to Embodiment 3 are similar to those of the vehicle-vehicle communication systems according to Embodiments 1 and 2, and therefore similar locations are denoted by the same reference signs thereas, and detailed description is omitted.

The invention claimed is:

1. A vehicle-vehicle communication system for performing wireless communication between a plurality of vehicles each having an in-vehicle communication apparatus for transmitting and receiving information by wireless signals, the vehicle-vehicle communication system comprising
 a roadside communication apparatus that is installed on a road, includes a roadside reception unit configured to receive information transmitted by the in-vehicle communication apparatus using a wireless signal and a roadside transmission unit configured to transmit information to the in-vehicle communication apparatus using a wireless signal, and is configured to relay communication between vehicles by transmitting the information received by the roadside reception unit using the roadside transmission unit,
 wherein the in-vehicle communication apparatus includes:
 an acquisition unit configured to acquire information relating to the vehicle; and
 a vehicle-side transmission unit configured to wirelessly transmit the information acquired by the acquisition unit,
 the roadside communication apparatus includes a relay determination unit configured to determine, based on the information received by the roadside reception unit, whether or not the information is to be relayed,
 if a position of a vehicle that is a transmission source of the information received by the roadside reception unit is within a predetermined range from a predetermined location on a road, the relay determination unit determines that the information is to be relayed, and
 if the position of the vehicle that is the transmission source is outside of the predetermined range from the predetermined location, the relay determination unit determines that the information is not to be relayed; and
 wherein the in-vehicle communication apparatus further includes a vehicle-side reception unit configured to receive information wirelessly transmitted by an in-vehicle communication apparatus mounted in another vehicle and information wirelessly transmitted by the roadside transmission unit of the roadside communication apparatus;

a determination unit configured to determine whether or not the information received by the vehicle-side reception unit is needed; and an information processing unit configured to perform information processing based on information determined by the determination unit as being needed.

2. The vehicle-vehicle communication system according to claim 1, wherein the determination unit determines that the information received by the vehicle-side reception unit is not needed if the information is information that is the same as information that was received previously.

3. The vehicle-vehicle communication system according to claim 1, wherein the determination unit determines that the information received by the vehicle-side reception unit is not needed if the information is information that was transmitted by the vehicle-side transmission unit of the in-vehicle communication apparatus.

4. The vehicle-vehicle communication system according to claim 1, wherein the information processing unit performs processing for transmitting information determined by the determination unit as being needed to another in-vehicle device mounted in the vehicle.

5. The vehicle-vehicle communication system according to claim 1, wherein if a vehicle that is a transmission source of the information received by the roadside reception unit is in a stopped state, the relay determination unit determines that the information is not to be relayed, and if the vehicle that is the transmission source is not in the stopped state, the relay determination unit determines that the information is to be relayed.

6. The vehicle-vehicle communication system according to claim 1, wherein if an advancing direction of a vehicle that is a transmission source of the information received by the roadside reception unit is a direction of approaching a predetermined location on a road, the relay determination unit determines that the information is to be relayed, and if the advancing direction of the vehicle that is the transmission source is a direction of moving away from the predetermined location, the relay determination unit determines that the information is not to be relayed.

7. The vehicle-vehicle communication system according to claim 1, wherein the relay determination unit expands and contracts the predetermined range according to the number of vehicles that are present within the predetermined range.

8. The vehicle-vehicle communication system according to claim 1, wherein the roadside communication apparatus includes:

an identification information addition unit configured to add identification information of the roadside communication apparatus to information that is to be relayed; and the relay determination unit configured to determine whether or not the information received by the roadside reception unit is to be relayed according to whether or not the identification information of the roadside communication apparatus or identification information of another roadside communication apparatus has been added to the information.

9. A roadside communication apparatus that is installed on a road, the roadside communication apparatus comprising:

a roadside reception unit configured to receive information transmitted by a vehicle using a wireless signal;

a roadside transmission unit configured to transmit information to a vehicle using a wireless signal;

a relay determination unit configured to, based on the information received by the roadside reception unit, determine whether or not the information is to be relayed; and a relay unit configured to, based on a determination result of the relay determination unit, relay communication between vehicles by transmitting the information received by the roadside reception unit using the roadside transmission unit, wherein if a position of a vehicle that is a transmission source of the information received by the roadside reception unit is within a predetermined range from a predetermined location on a road, the relay determination unit determines that the information is to be relayed, and if the position of the vehicle that is the transmission source is outside of the predetermined range from the predetermined location, the relay determination unit determines that the information is not to be relayed; and wherein if a vehicle that is a transmission source of the information received by the roadside reception unit is in a stopped state, the relay determination unit determines that the information is not to be relayed, and if the vehicle that is the transmission source is not in the stopped state, the relay determination unit determines that the information is to be relayed.

10. The roadside communication apparatus according to claim 9, wherein if an advancing direction of a vehicle that is a transmission source of the information received by the roadside reception unit is a direction of approaching a predetermined location on a road, the relay determination unit determines that the information is to be relayed, and if the advancing direction of the vehicle that is the transmission source is a direction of moving away from the predetermined location, the relay determination unit determines that the information is not to be relayed.

11. The roadside communication apparatus according to claim 9, wherein the relay determination unit expands and contracts the predetermined range according to the number of vehicles that are present within the predetermined range.

12. The roadside communication apparatus according to claim 9, comprising:

an identification information addition unit configured to add identification information of the roadside communication apparatus to information that is to be relayed; and a relay determination unit configured to determine whether or not the information received by the roadside reception unit is to be relayed according to whether or not the identification information of the roadside communication apparatus or identification information of another roadside communication apparatus has been added to the information.

* * * * *